(12) United States Patent
Park et al.

(10) Patent No.: US 12,354,310 B2
(45) Date of Patent: Jul. 8, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Yousun Park, Seoul (KR); Sejin Oh, Seoul (KR); Hyejung Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 18/024,951

(22) PCT Filed: Aug. 23, 2021

(86) PCT No.: PCT/KR2021/011175
§ 371 (c)(1),
(2) Date: Mar. 6, 2023

(87) PCT Pub. No.: WO2022/050612
PCT Pub. Date: Mar. 10, 2022

(65) Prior Publication Data
US 2024/0029311 A1 Jan. 25, 2024

(30) Foreign Application Priority Data
Sep. 7, 2020 (KR) .................. 10-2020-0114035

(51) Int. Cl.
G06T 9/00 (2006.01)

(52) U.S. Cl.
CPC .................................. *G06T 9/001* (2013.01)

(58) Field of Classification Search
CPC .. G06T 9/001; G06T 7/11; G06T 9/40; H04N 19/597; H04N 19/70; H04N 19/96
See application file for complete search history.

(56) References Cited

U.S. PATENT DOCUMENTS

| 11,217,037 | B2* | 1/2022 | Park | H04N 19/124 |
| 11,803,986 | B2* | 10/2023 | Hur | H04N 19/30 |
| 11,895,341 | B2* | 2/2024 | Oh | H04N 19/119 |
| 11,902,348 | B2* | 2/2024 | Hur | H04L 67/06 |
| 2018/0158235 | A1* | 6/2018 | Wu | G06T 19/20 |
| 2019/0156519 | A1 | 5/2019 | Mammou et al. | |
| 2021/0104075 | A1* | 4/2021 | Mammou | G06T 9/40 |
| 2021/0400103 | A1* | 12/2021 | Hur | H04L 65/75 |
| 2022/0222863 | A1* | 7/2022 | Han | G06T 9/001 |

(Continued)

FOREIGN PATENT DOCUMENTS

KR 10-2020-0039757 A 4/2020
KR 10-2020-0065076 A 6/2020
(Continued)

*Primary Examiner* — Farzana Hossain
(74) *Attorney, Agent, or Firm* — BRYAN CAVE LEIGHTON PAISNER LLP

(57) ABSTRACT

A point cloud data transmission method, according to embodiments, may comprise the steps of: encoding point cloud data; and transmitting a bitstream including the point cloud data. In addition, a point cloud data transmission device, according to embodiments, may comprise: an encoder for encoding point cloud data; and a transmitter for transmitting a bitstream including the point cloud data.

22 Claims, 32 Drawing Sheets

(56) References Cited

U.S. PATENT DOCUMENTS

| | | | | |
|---|---|---|---|---|
| 2022/0239956 A1* | 7/2022 | Tourapis | ............... | G06T 9/001 |
| 2022/0262043 A1* | 8/2022 | Nakagami | ............... | G06T 9/001 |
| 2022/0353531 A1* | 11/2022 | Hur | ............... | H04N 19/96 |
| 2023/0154052 A1* | 5/2023 | Oh | ............... | G06T 9/40 |
| | | | | 375/240.01 |
| 2023/0206510 A1* | 6/2023 | Hur | ............... | G06T 9/001 |
| | | | | 382/232 |
| 2023/0232042 A1* | 7/2023 | Hur | ............... | H04N 19/164 |
| | | | | 375/240.08 |
| 2023/0239501 A1* | 7/2023 | Oh | ............... | H04N 19/136 |
| | | | | 375/240.08 |
| 2023/0360273 A1* | 11/2023 | Oh | ............... | H04N 19/96 |
| 2023/0388557 A1* | 11/2023 | Oh | ............... | H04N 21/4402 |
| 2023/0394712 A1* | 12/2023 | Park | ............... | G06T 9/001 |
| 2024/0163426 A1* | 5/2024 | Oh | ............... | H04N 19/172 |

FOREIGN PATENT DOCUMENTS

| | | | |
|---|---|---|---|
| KR | 10-2020-0069289 A | 6/2020 | |
| WO | 2019-197708 A1 | 10/2019 | |

* cited by examiner

FIG. 6
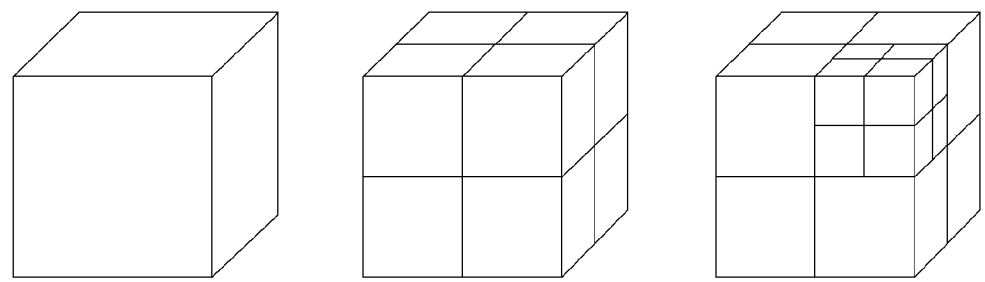
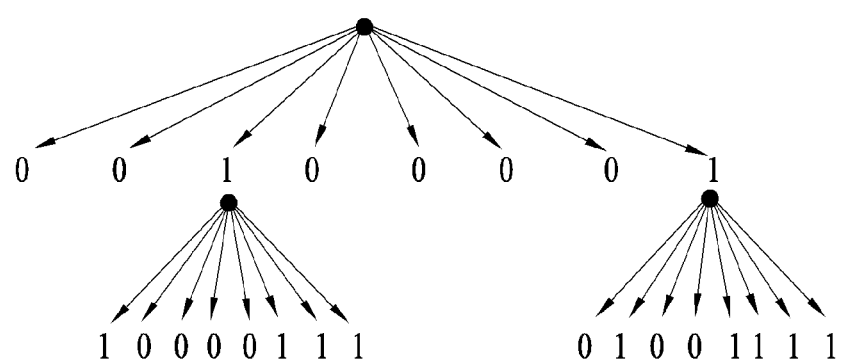

FIG. 7
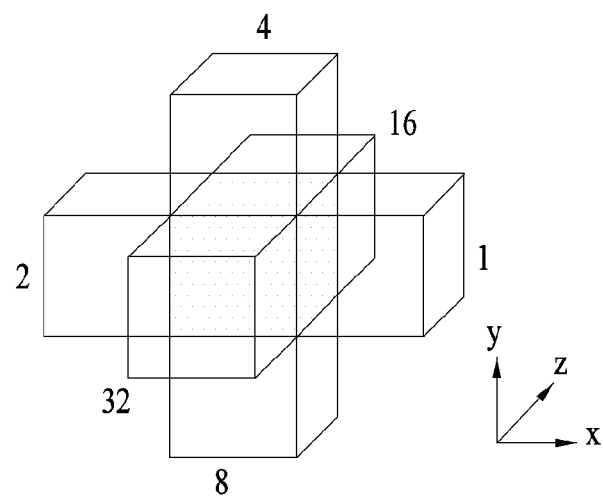
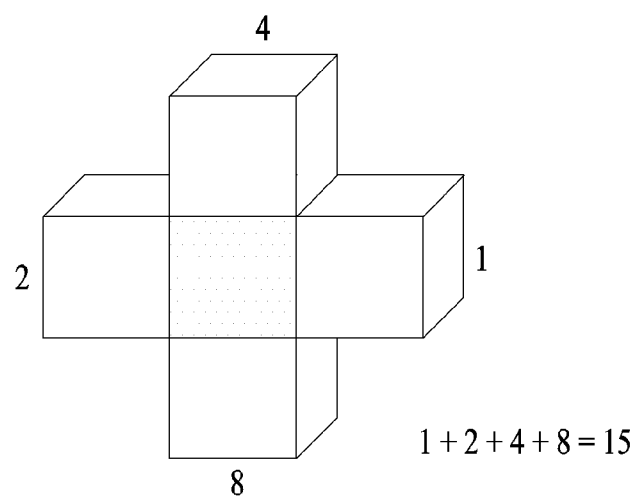
1 + 2 + 4 + 8 = 15

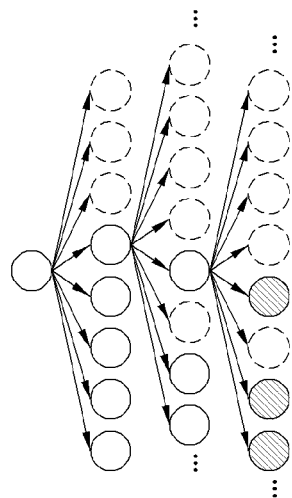
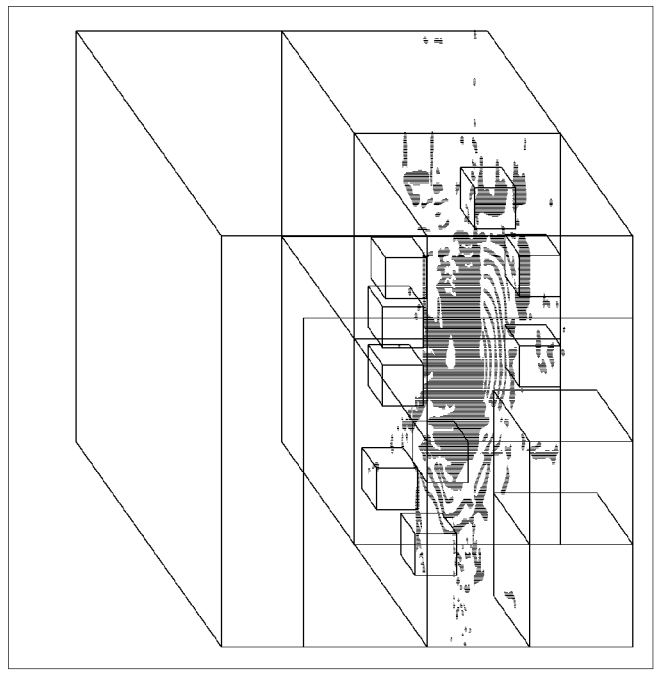
FIG. 16

FIG. 24

| seq_parameter_set_rbsp( ) { | Descriptor |
|---|---|
| ... | |
|   object_partitioning_method | ue(v) |
|   object_num | ue(v) |
|   for(i = 0; i < object_num; i++) { | |
|     object_offset | ue(v) |
|     object_quantization_flag | u(1) |
|     object_scaling_flag | u(1) |
|     if(object_quantization_flag) | |
|       object_quantization_parameter | ue(v) |
|     if(object_scaling_flag) | |
|       object_scaling_value | ue(v) |
|       object_whd | ue(v) |
|   } | |
| ... | |
| } | |

FIG. 25

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ] | ue(v) |
| tile_bounding_box_size_width[ i ] | ue(v) |
| tile_bounding_box_size_height[ i ] | ue(v) |
| } | |
| object_partitioning_method | ue(v) |
| object_num | ue(v) |
| for(i = 0; i < object_num; i++) { | |
| object_offset | ue(v) |
| object_quantization_flag | u(1) |
| object_scaling_flag | u(1) |
| if(object_quantization_flag) | |
| object_quantization_parameter | ue(v) |
| if(object_scaling_flag) | |
| object_scaling_value | ue(v) |
| object_whd | ue(v) |
| } | |
| ... | |
| } | |

FIG. 26

| geometry_parameter_set( ) { | Descriptor |
|---|---|
| ... | ue(v) |
| object_partitioning_method | ue(v) |
| object_num | ue(v) |
| for(i = 0; i < object_num; i++) { | |
|   object_offset | ue(v) |
|   object_quantization_flag | u(1) |
|   object_scaling_flag | u(1) |
|   if(object_quantization_flag) | |
|     object_quantization_parameter | ue(v) |
|   if(object_scaling_flag) | |
|     object_scaling_value | ue(v) |
|     object_whd | ue(v) |
| } | |
| ... | |
| } | |

FIG. 27

| attribute_parameter_set( ) { | Descriptor |
|---|---|
| ... | |
|   object_partitioning_method | ue(v) |
|   object_num | ue(v) |
|   for(i = 0; i < object_num; i++) { | |
|     object_offset | ue(v) |
|     object_quantization_flag | u(1) |
|     object_scaling_flag | u(1) |
|     if(object_quantization_flag) | |
|       object_quantization_parameter | ue(v) |
|     if(object_scaling_flag) | |
|       object_scaling_value | ue(v) |
|       object_whd | ue(v) |
|   } | |
| ... | |
| } | |

FIG. 28

| geometry_slice_header( ) { | Descriptor |
|---|---|
| ... | |
|   object_partitioning_method | ue(v) |
|   object_num | ue(v) |
|   for(i = 0; i < object_num; i++) { | |
|     object_offset | ue(v) |
|     object_quantization_flag | u(1) |
|     object_scaling_flag | u(1) |
|     if(object_quantization_flag) | |
|       object_quantization_parameter | ue(v) |
|     if(object_scaling_flag) | |
|       object_scaling_value | ue(v) |
|       object_whd | ue(v) |
|   } | |
| ... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is the National Stage filing under 35 U.S.C. 371 of International Application No. PCT/KR2021/011175, filed on Aug. 23, 2021, which claims the benefit of and priority to Korean Application No. 10-2020-0114035, filed on Sep. 7, 2020, the entire contents of which are incorporated herein for all purposes by this reference.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 16 schematically illustrates an octree-based partitioned space;

FIG. 24 illustrates an exemplary syntax of a sequence parameter set according to embodiments.

FIG. 25 illustrates an exemplary syntax of a tile parameter set according to embodiments;

FIG. 26 illustrates an exemplary syntax of a geometry parameter set according to embodiments.

FIG. 27 illustrates an exemplary syntax of an attribute parameter set according to embodiments;

FIG. 28 illustrates an exemplary syntax of a slice header of a geometry bitstream according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
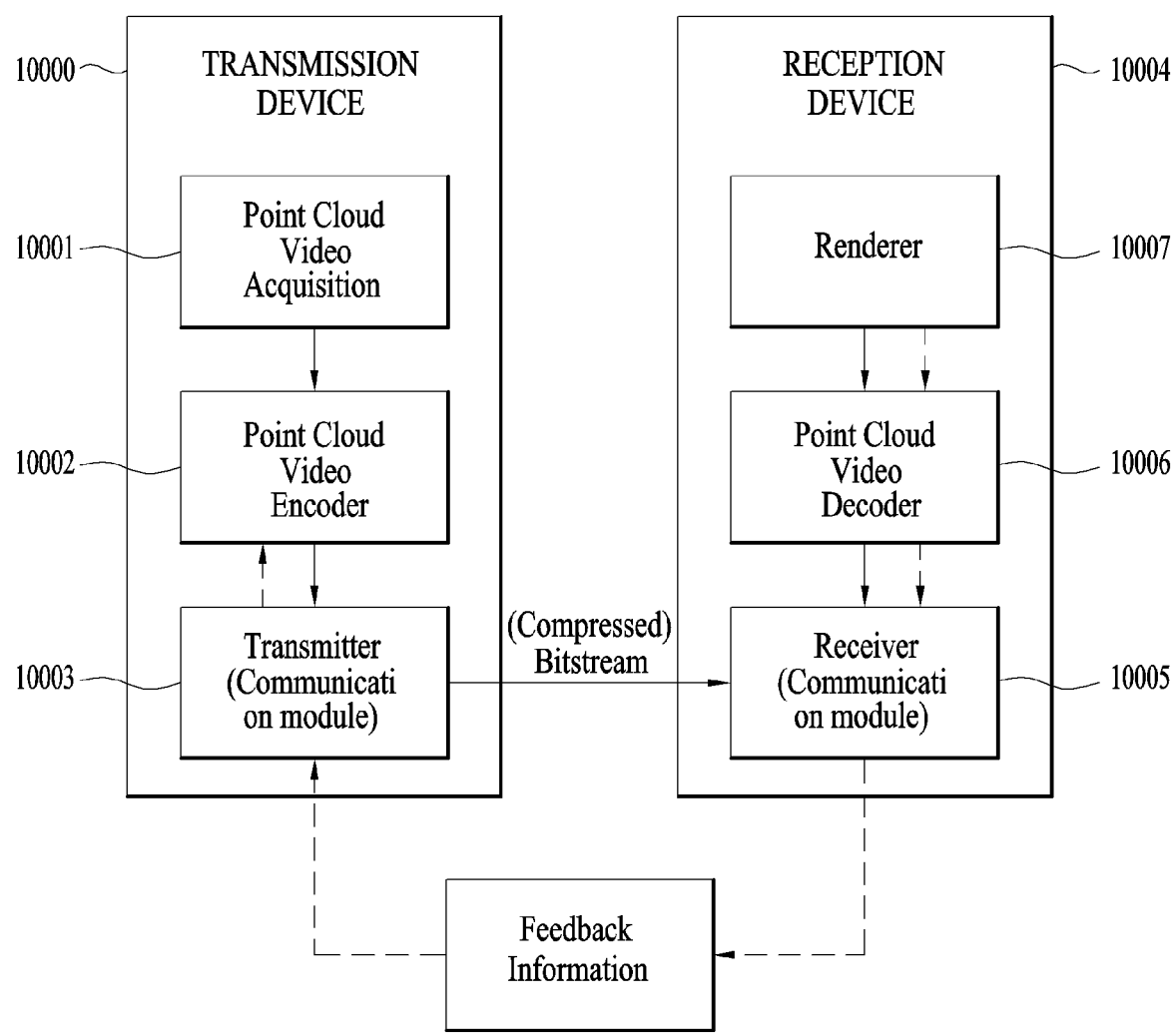
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
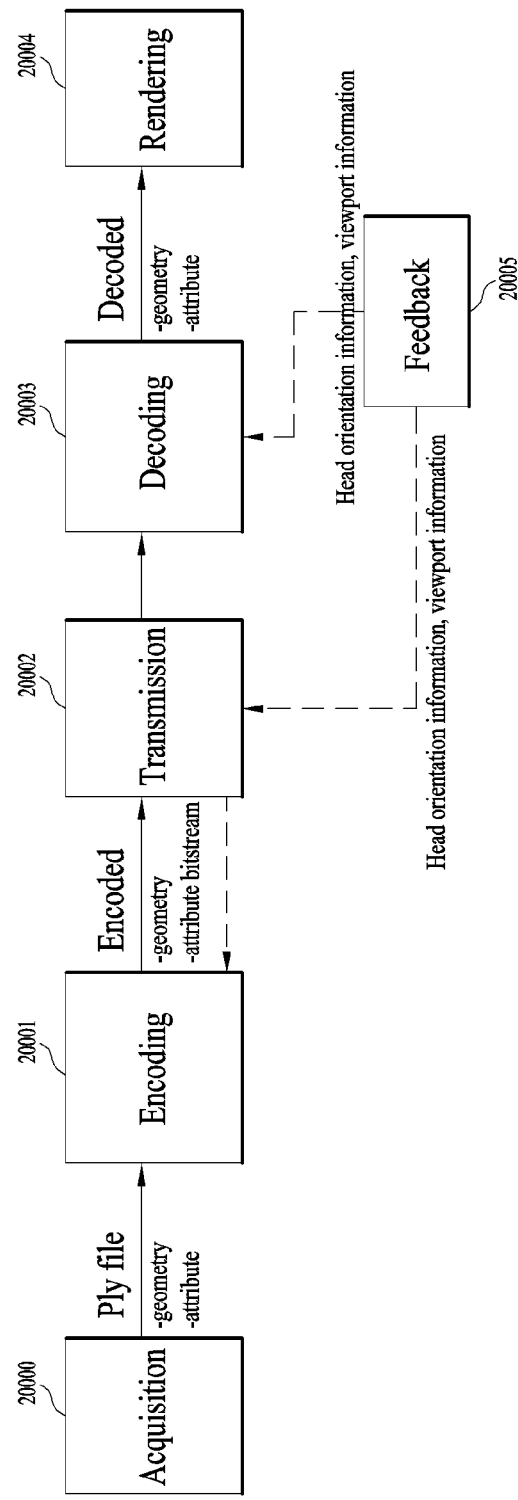
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
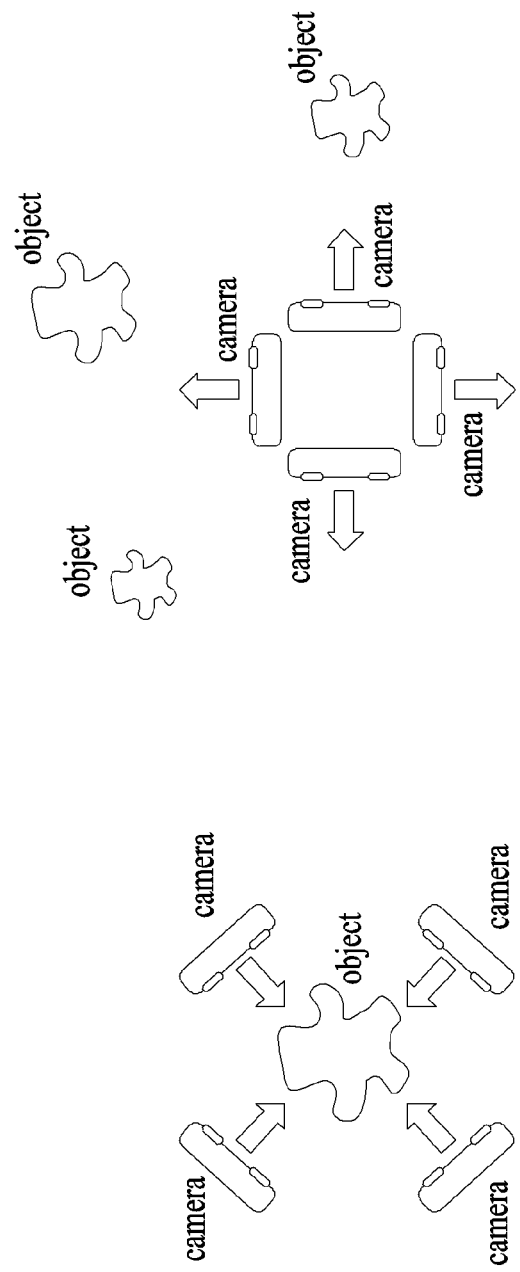
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
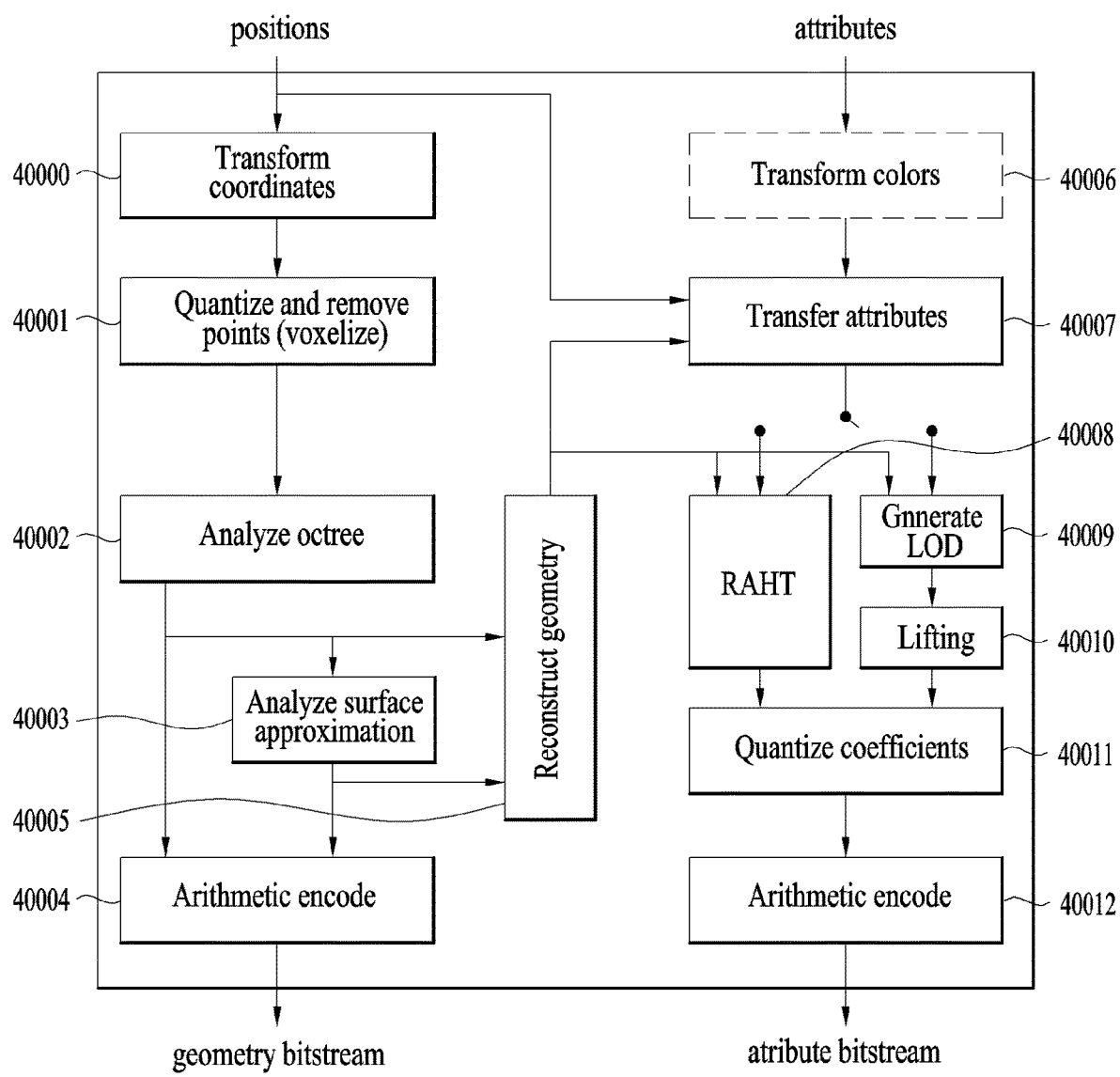
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, predictive geometry coding direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree, the predictive tree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates all representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
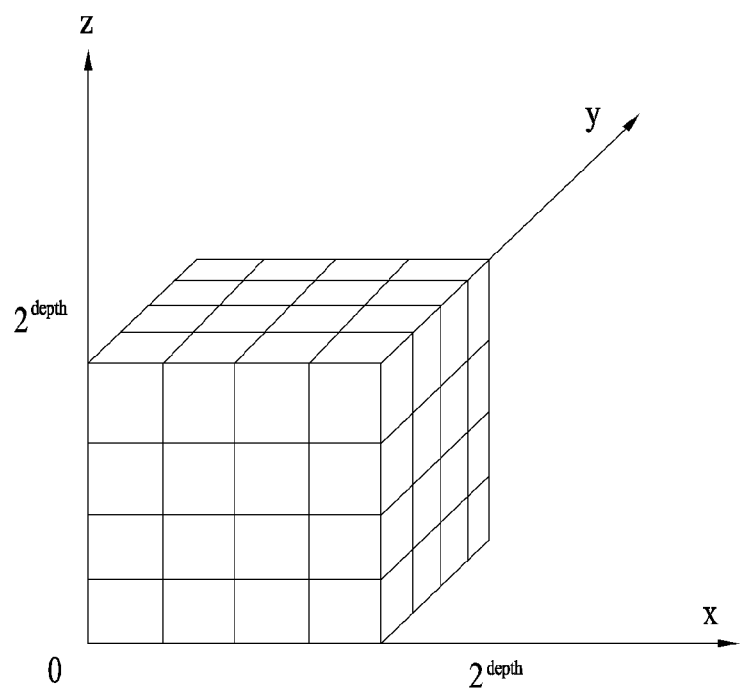
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, 2d may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d=\text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x, \Delta y, \Delta z$) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\text{i)} \begin{bmatrix} \mu_x \\ \mu_y \\ \mu_z \end{bmatrix} = \frac{1}{n} \sum_{k=1}^{n} \begin{bmatrix} x_i \\ y_i \\ z_i \end{bmatrix};$$

$$\text{ii)} \begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

$$\text{iii)} \begin{bmatrix} \sigma_x^2 \\ \sigma_y^2 \\ \sigma_z^2 \end{bmatrix} = \sum_{k=1}^{n} \begin{bmatrix} \overline{x}_i^2 \\ \overline{y}_i^2 \\ \overline{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
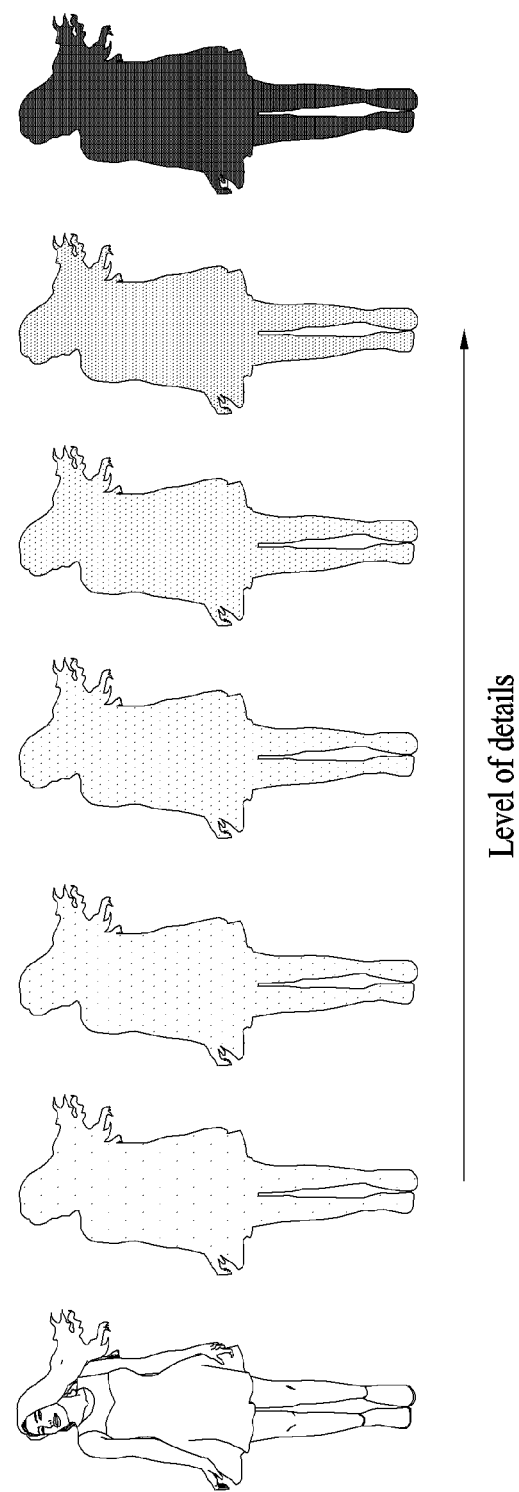
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
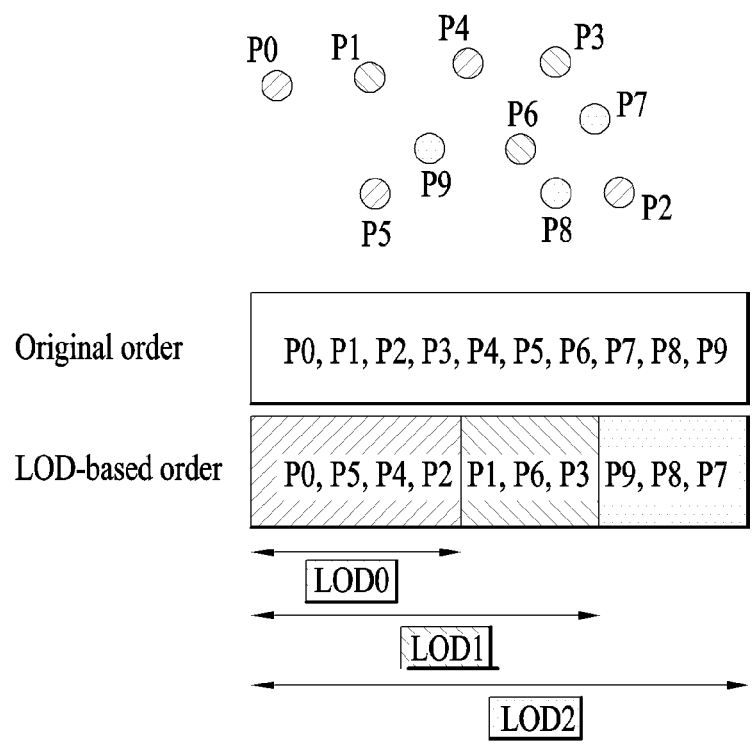
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE 1

Attribute prediction residuals quantization pseudo code

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 2

Attribute prediction residuals inverse quantization pseudo code

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{2x,y,z} \\ g_{l2x+1,y,z} \end{bmatrix},$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The gDC value is also quantized like the high-pass coefficients and subjected to entropy coding.

Figure 10:
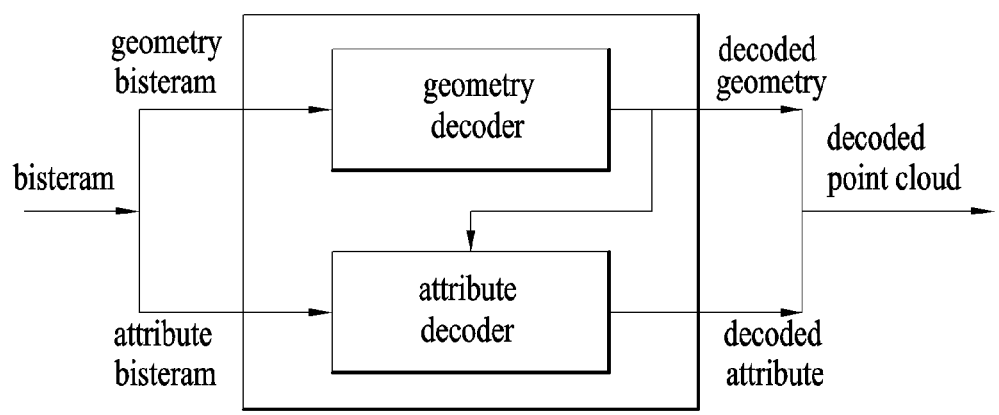
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
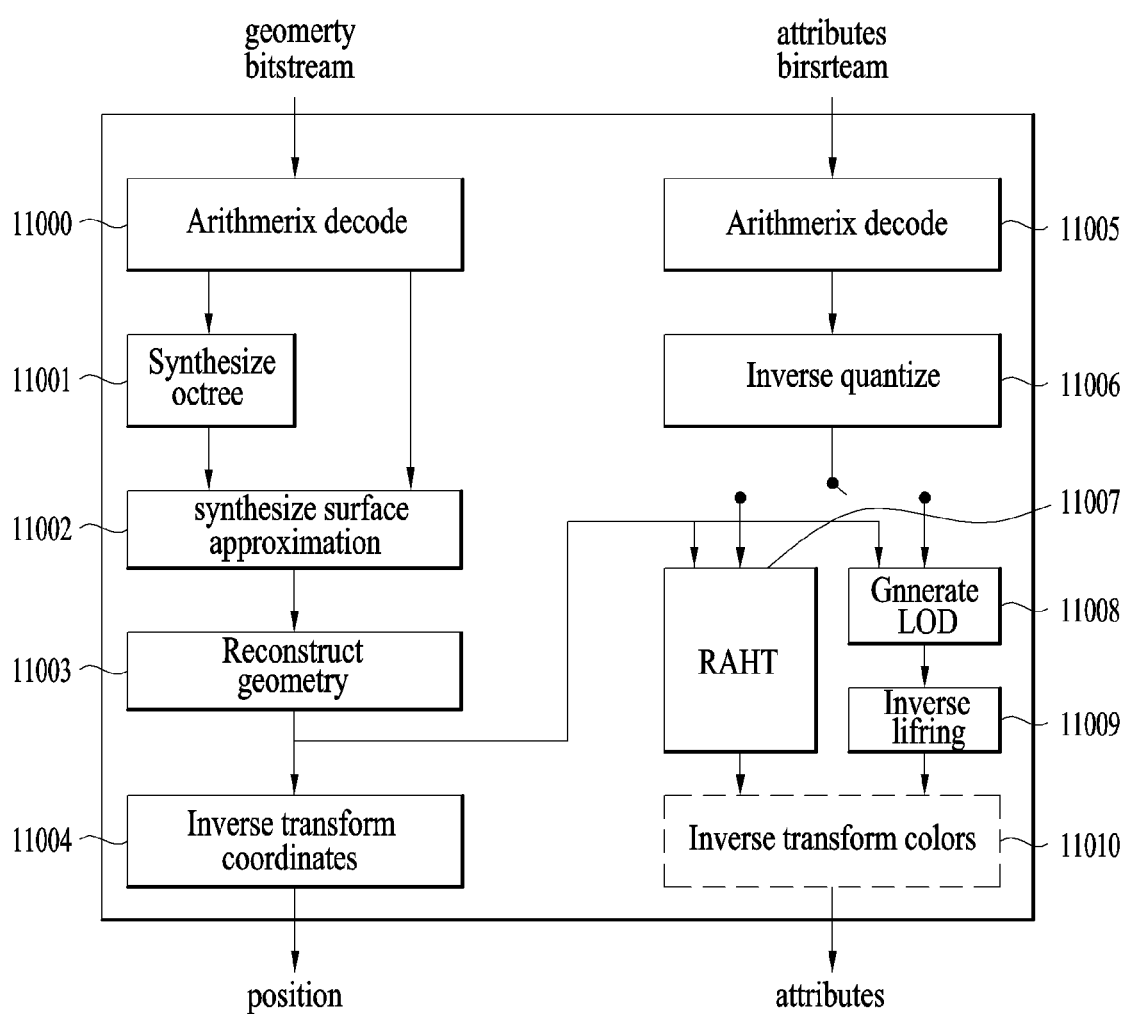
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
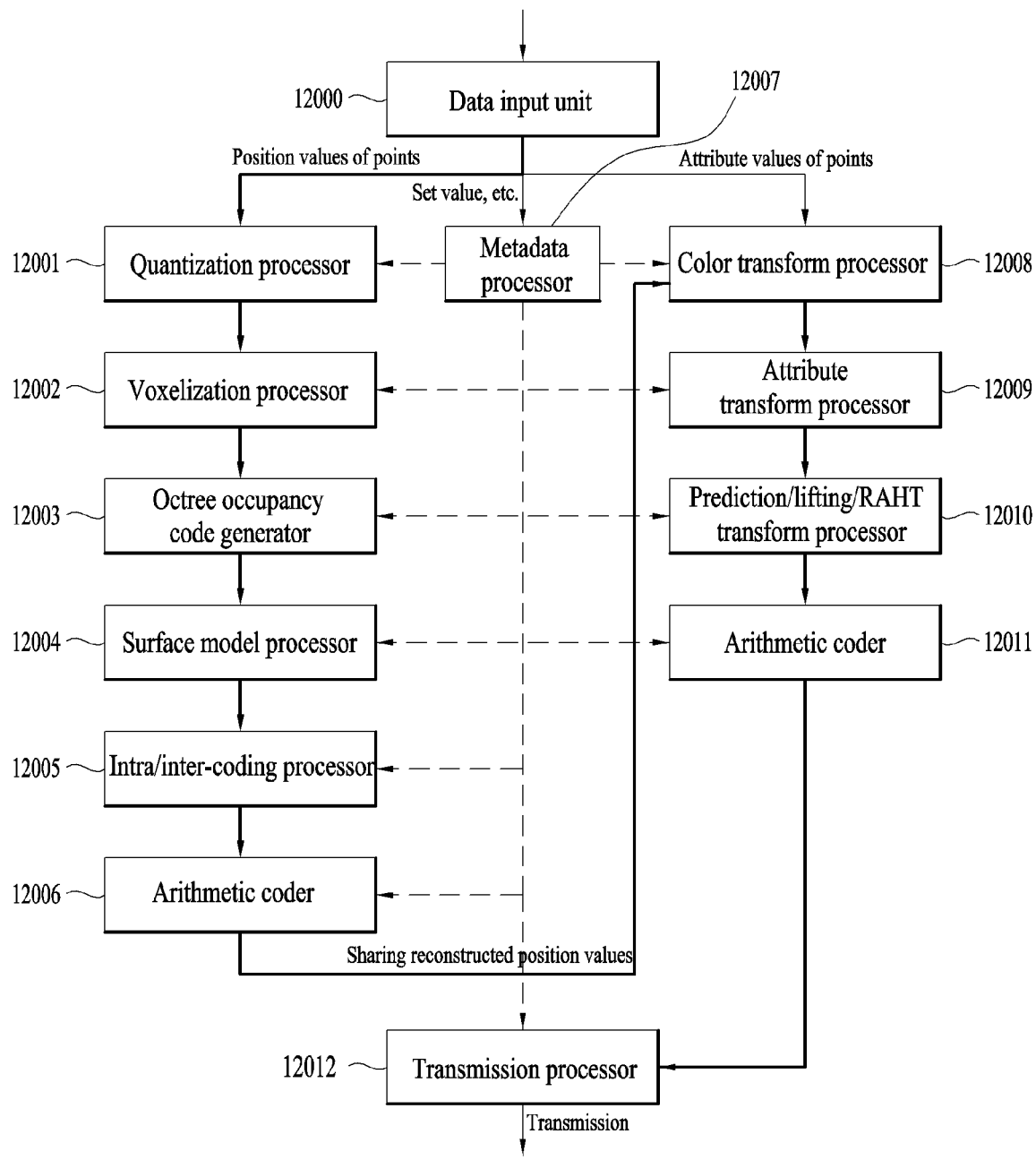
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
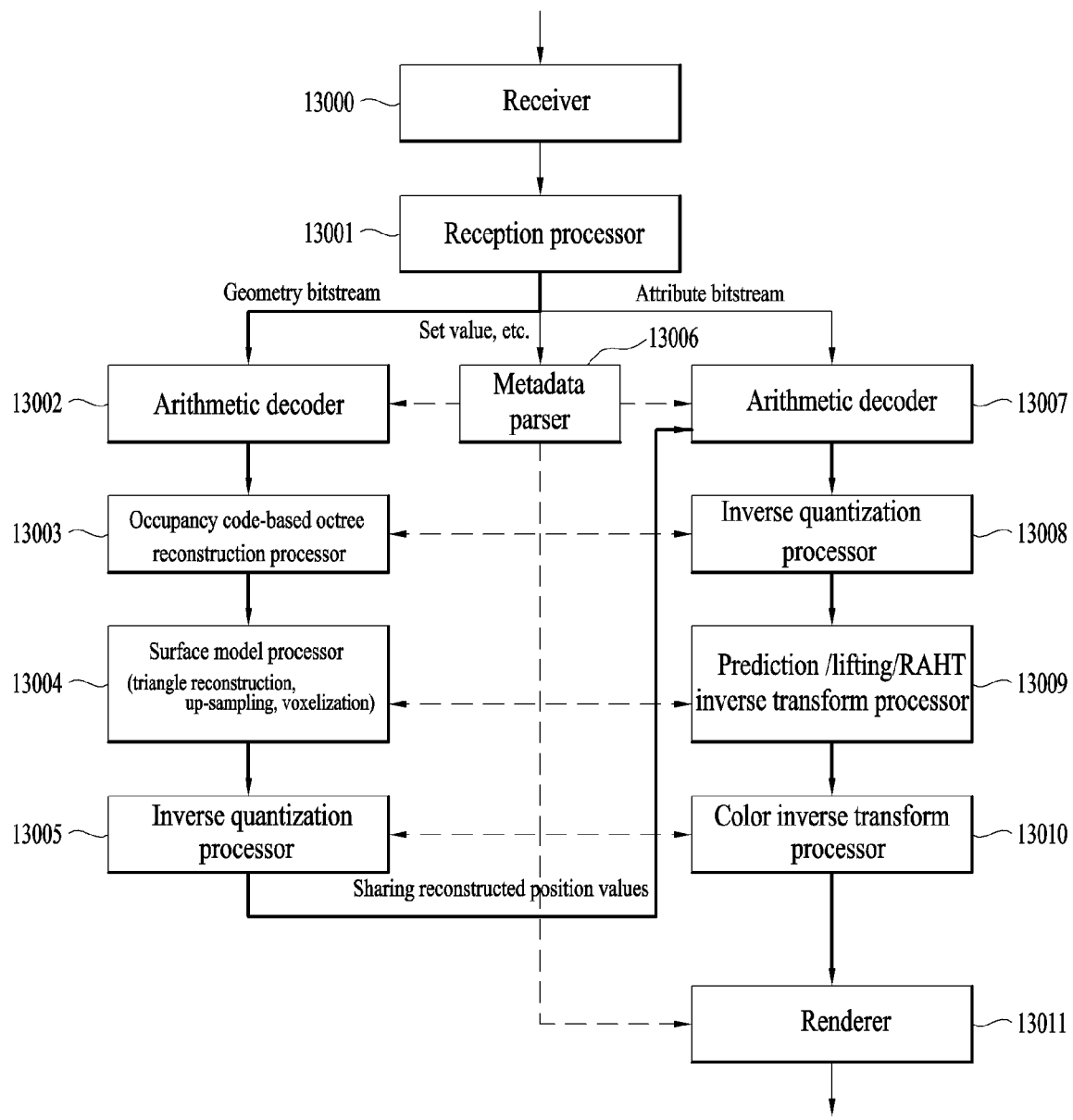
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
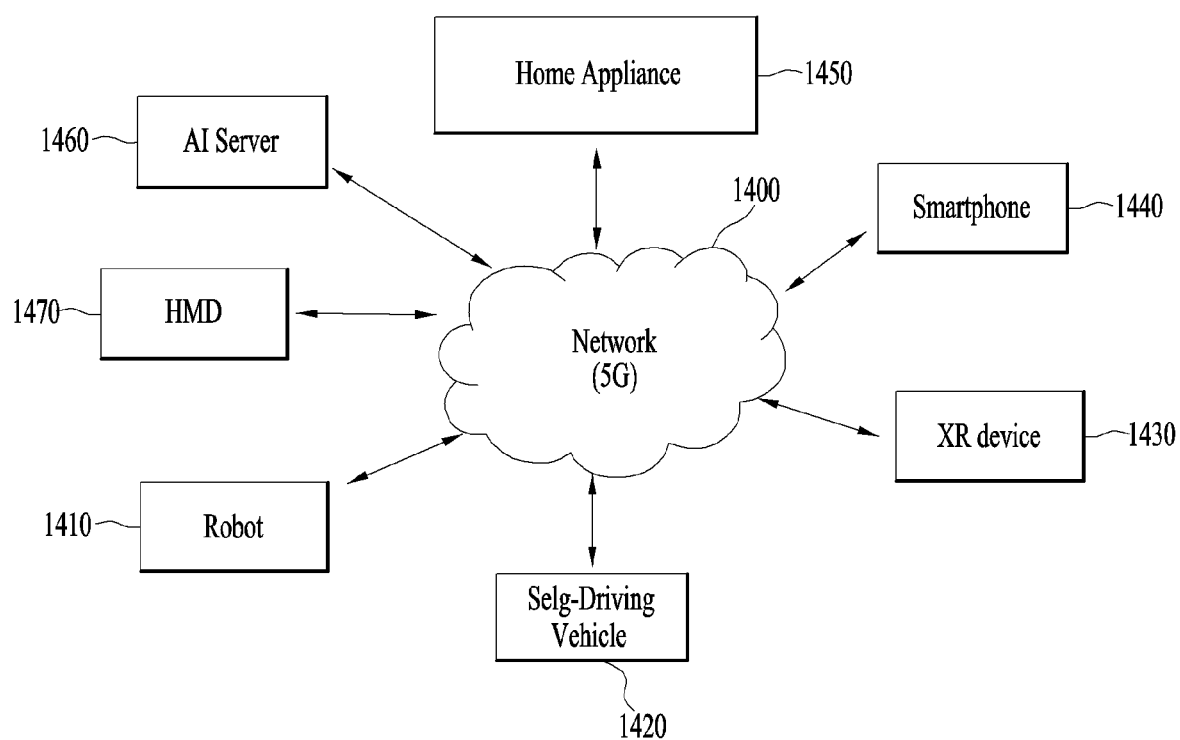
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
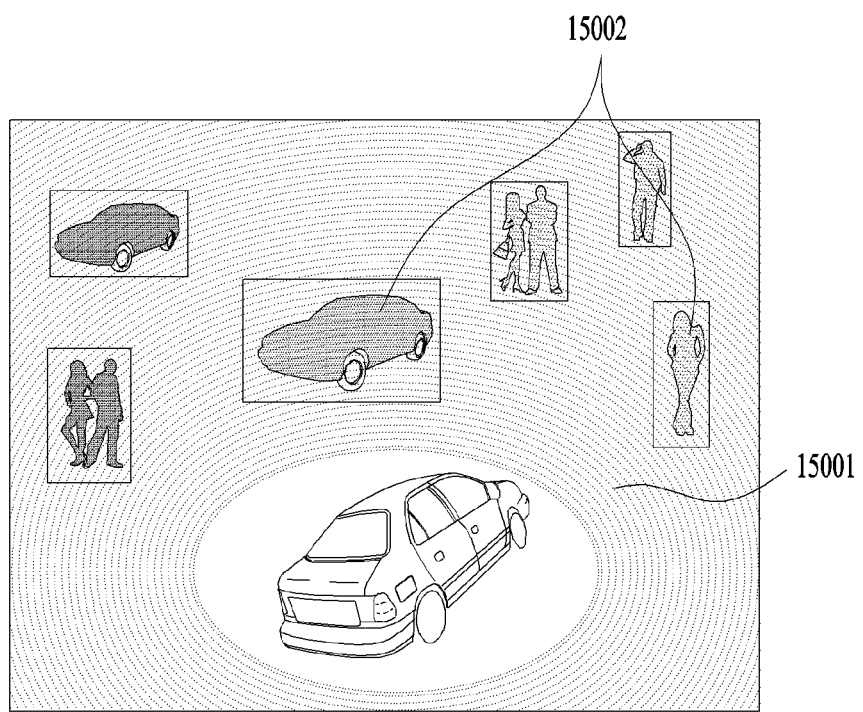
FIG. 15 illustrates exemplary point cloud data according to embodiments.

FIG. 15 illustrates exemplary point cloud data according to embodiments.

The point cloud data may be acquired (20000) by the point cloud video acquirer 10001 according to the embodiments and be encoded (20001) by the point cloud video encoder 10002 according to the embodiments. In addition, the point cloud data may be received or acquired by the data input unit 12000 according to the embodiments. The data input unit 12000 may perform an identical or similar operation and/or acquisition method to the operation and/or acquisition method of the point cloud video acquirer 10001 (or the acquisition process 20000 described in FIG. 2).

Figure 21:
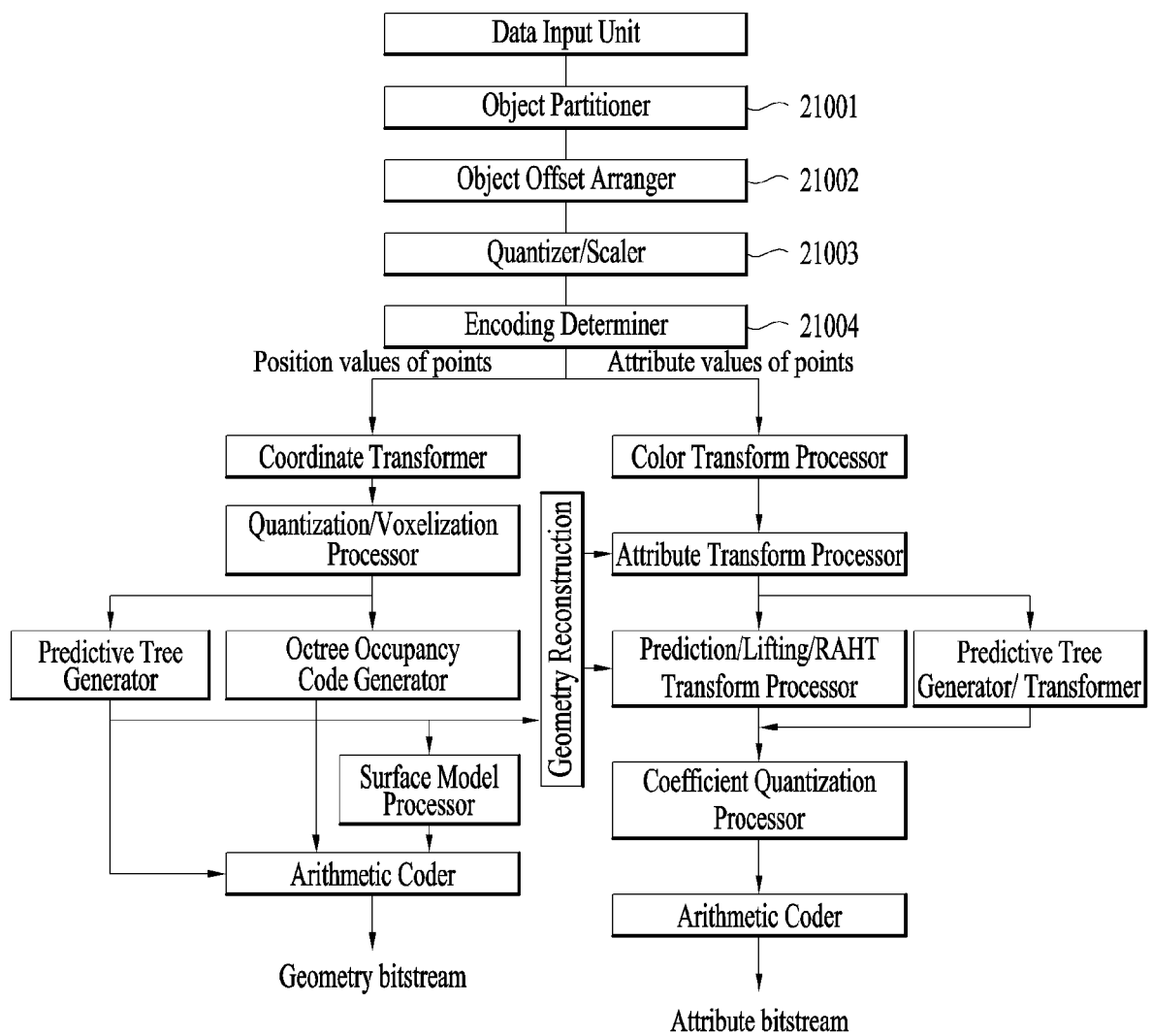
FIG. 21 illustrates an exemplary point cloud data transmission device according to embodiments.

The point cloud data of FIG. 15 may be encoded by the point cloud video encoder 10002 of FIG. 1, the encoding process 20001 of FIG. 2, the encoder of FIG. 4, the transmission device of FIG. 12, the XR device 1430 of FIG. 14, a transmission device of FIG. 21, and/or hardware including one or more processors or integrated circuits configured to communicate with one or more memories, software, firmware, or a combination thereof.

The point cloud data may be encoded in a process (S2900 of FIG. 29) of encoding the point cloud data according to the embodiments, and the encoded point cloud data may be transmitted to a reception device as a bitstream in a process (S2910) of transmitting the bitstream according to the embodiments. In the reception device 10004 according to the embodiments, the receiver 10005 may receive the bitstream including the point cloud data (S3000 of FIG. 30), and the point cloud decoder 10006 may decode the received point cloud data (S3010).

Meanwhile, the point cloud data is composed of a set of points, and each point includes geometry data (location information) and attribute data (attribute information). The process of encoding the point cloud data may include a process of compressing the geometry data and compressing the attribute data based on the geometry data reconstructed as changed information through compression. The geometry data includes coordinate information (location information or geometry information) on points. The geometry data may be represented as location information of each point, for example, a coordinate vector (x, y) in a 2-dimensional Cartesian coordinate system, ($\gamma$, $\theta$) in a cylindrical coordinate system, (x, y, z) of a Cartesian coordinate system in a 3-dimensional space, (r, $\theta$, z) of a cylindrical coordinate system, or (r, $\theta$, $\Phi$) of a spherical coordinate system.

The attribute data may be a vector of a value obtained from one or multiple sensors, such as a vector (R, G, B)

representing color of a point, a brightness value, a reflection coefficient of a lidar, and/or a temperature value obtained from a thermal imaging camera.

Meanwhile, the point cloud data may be classified into category 1 to category 3 according to characteristics thereof. Category-1 data is static data consisting of one sheet of frame. Category 3 data is dynamic data consisting of N sheets of frames or consisting of several points according to a method. Category 3 frame data having an average of one million or less points per sheet may be encoded/decoded for each frame and may be configured in units of bitstreams.

FIG. 15 illustrates exemplary category 3 frame data. The category 3 frame data has a relatively low density of points, as compared to static data, and each point includes a reflectance value. The category 3 frame data generally has a low density, but when objects are individually partitioned, points corresponding to each object have a high density. Processing of the category 3 frame data aims at low-latency real-time processing in autonomous driving.

Referring to FIG. 15, a plurality of pedestrians or vehicles is shown around a driving vehicle. Not only a road (floor) on which the vehicle is traveling, but also each of pedestrians and other nearby vehicles correspond to an object. Geometry data and attribute data for objects, collected by lidar sensors, are encoded and transmitted by a transmission device according to embodiments, and are represented after being received and decoded, and rendered by a reception device according to embodiments.

On the other hand, a conventional octree-based geometry data coding method has the disadvantage that decoding is capable of being performed only when an octree is split in an encoder up to a leaf, and a conventional predictive tree-based geometry data coding method has the disadvantage that a predictive tree relationship should be formed for all points. In addition, in the case of octree-based geometry data coding, compression efficiency increases as the density of points in a small space increases, whereas, in the case of predictive tree-based geometry data coding, compression efficiency increases when the density of points is lower relative to the octree-based coding method.

In the geometry-based point cloud compression (G-PPC (? G-PCC)) standard, a minimum coding unit is a slice. In the category 3 frame data, total frames are composed of one slice, so that an efficiency difference according to the density of points during encoding/decoding is large. The category 3 frame data is characterized in that there is a large number of points in an object or a road and there is a small number of points in other spaces. Since conventional technology applies a single coding method to the category 3 frame data, it is difficult to perform efficient coding based on distribution characteristics of points. In addition, during motion estimation in inter-frame prediction, although there is a big difference in motion between a road and a moving object, all points corresponding to the object are used without distinguishing between the points corresponding to the object, thereby lowering estimation accuracy.

FIG. 16 schematically illustrates an octree-based partitioned space. In the right figure FIG. 16, circles represent spatially partitioned nodes based on an octree, nodes including points are represented by solid lines, and nodes not including points are represented by dotted lines. In addition, hatched circles represent nodes that contain objects therein. In the left figure of FIG. 16, a cube represents a node and is divided into 8 cubes to create sub-nodes. In octree-based spatial partitioning, as a depth level increases, sub-nodes are created and the size of the sub-nodes decreases. In octree-based spatial partitioning, partitioning is performed up to a depth level that guarantees accuracy. A set of points constituting one object may be included in one node. An octree-based coding method has a problem in that compression efficiency deteriorates because many empty nodes are generated in the case of low-density point cloud data.

Figure 17:
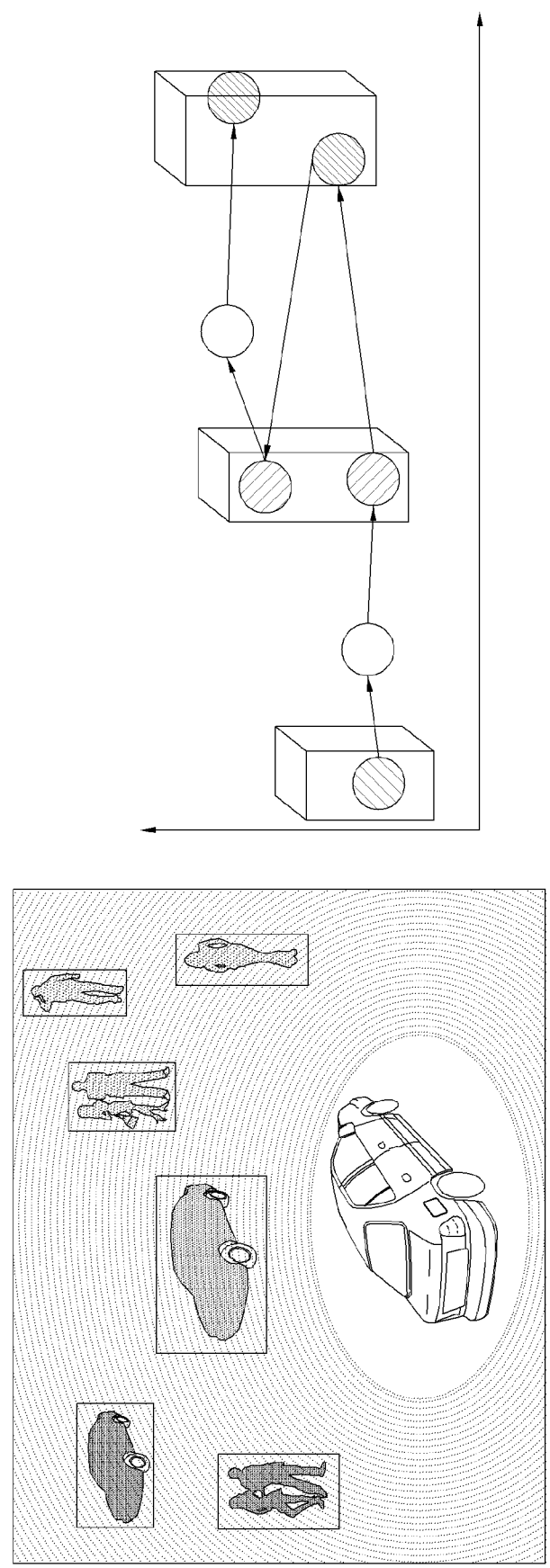
FIG. 17 illustrates an exemplary coding order of points in geometry data coding according to embodiments.

FIG. 17 illustrates a coding (search) order of points during geometry data coding according to embodiments. The right figure of FIG. 17 is a graph illustrating a coding order when point cloud data is searched through azimuth/radius sorting. A y-axis represents an altitude, and the x-axis represents an azimuth. As illustrated in this graph, although points corresponding to the same object are close in distance to each other, since the points corresponding to the same object are mixedly coded in order with points corresponding to other objects, compression efficiency is lowered in predictive tree-based coding.

For a point cloud data processing method and processing apparatus according to embodiments, a method of increasing compression efficiency by partitioning objects in one data group and individually encoding and/or decoding the partitioned objects is proposed.

A user may adjust depth levels, quantization degrees, scaling degrees, etc. of the partitioned objects in octree coding and designate a decoding and/or encoding order according to priorities of the objects. Information related thereto may be signaled and transferred from an encoder to a decoder.

The decoder may perform decoding on the signaled information in a smaller unit than a slice. In addition, geometry data that is partitioned in units of objects, encoded, and included in a bitstream may be rearranged after offset adjustment in the decoder and decoded using a geometry coding method performed in the encoder.

FIG. 21 schematically illustrates components of a point cloud data transmission device according to embodiments. The transmission device (FIG. 21) may be configured by the point cloud video encoder 10002 of FIG. 1, the encoding process 20001 of FIG. 2, the encoder of FIG. 4, the transmission device of FIG. 12, the XR device 1430 of FIG. 14, and/or hardware including one or more processors or integrated circuits configured to communicate with one or more memories, software, firmware, or a combination thereof.

The point cloud data transmission device according to the embodiments includes an encoder for encoding point cloud data and a transmitter for transmitting a bitstream including the point cloud data. In addition, the transmission device may include an object partitioner 21001 for partitioning the point cloud data into objects and/or an object offset arranger 21002 for adjusting an offset of the point cloud data based on an object. The transmission device may further include a quantizer/scaler 21003 and/or an encoding determiner 21004.

The object partitioner 21001 is a component that partitions the point cloud data into objects. The object partitioner 21001 may partition the point cloud data into objects based on attribute data of points, distribution of points, geometry data, and/or change in data of points.

A process of partitioning the point cloud data based on the attribute data of the point cloud data is a process of partitioning points for each object using reflectance and/or color of the points. Since one object has similar physical and chemical properties, attribute data of points corresponding to one object may be similar. Accordingly, the object partitioner 21001 may recognize that points in a range in which attribute data is similar correspond to the same object to partition points according to each object. In this case, precision of attribute data may be lowered by performing encoding on each object. For example, if attribute data with a precision of $2^n$ is divided into m sections, each section has a precision of $2^n/m$. Therethrough, since an encoding residual value and/or a weight range may be reduced, compression efficiency may be increased. That is, since points having similar attribute data are collected and encoded, the compression efficiency is increased.

In addition, the object partitioner 21001 may partition points into objects in consideration of distribution of points in a direction of a specific axis. In this case, the specific axis may be an x, y, or z axis or an arbitrary axis to which rotation/transformation is applied.

The point cloud data may be partitioned into objects based on a threshold (geometry data) on the specific axis in consideration of distribution of points. For example, the number of points corresponding to a road is large, and the number of points corresponding to an object on the road is relatively small. Therefore, when the number of points rapidly increases or decreases based on the threshold (geometry data) on the specific axis, the points corresponding to the road and the points corresponding to the object on the road may be separated based on the threshold (geometry data). In the same manner, points corresponding to several objects may be separated according to each object. That is, the points corresponding to the road and the points corresponding to the object are separated based on the threshold of the specific axis (e.g., z axis), and the points corresponding to several objects may be separated based on another threshold of another specific axis (e.g., x axis and/or y axis). Point cloud data based on several objects may be separated based on a distance between points. Each group of points separated by a certain distance or more may be designated as an object.

Figure 18:
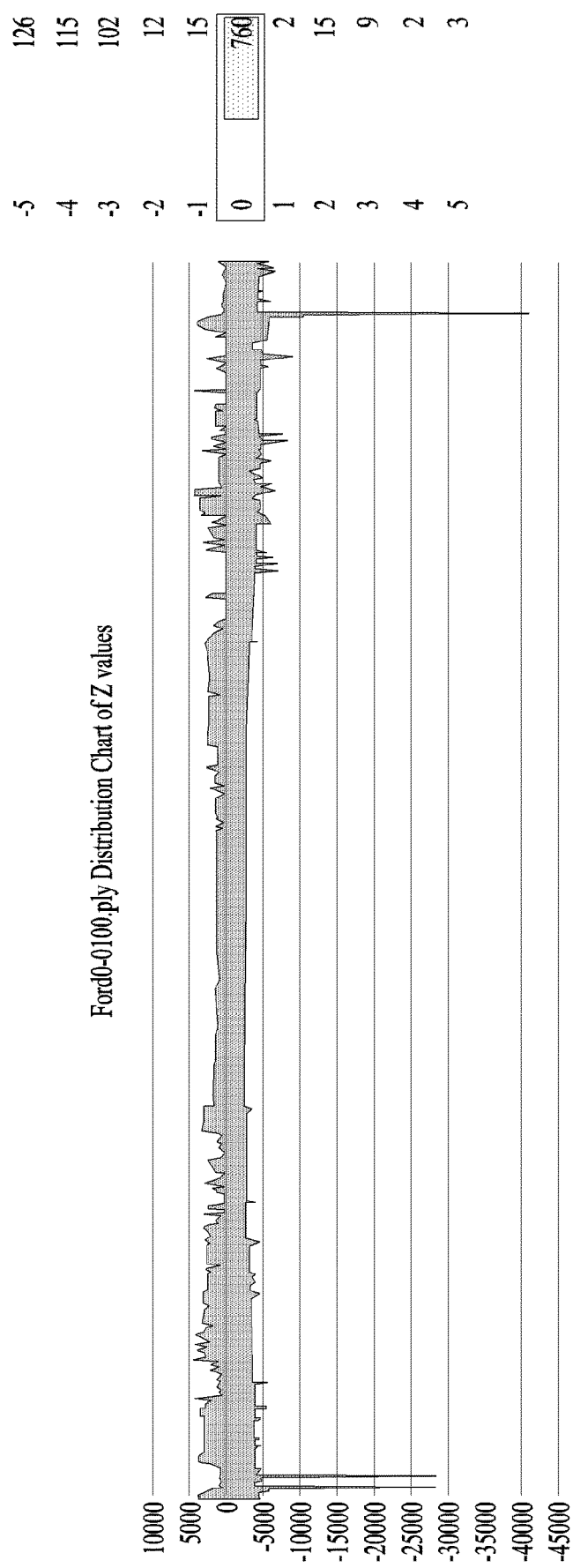
FIG. 18 illustrates an exemplary method of partitioning point cloud data based on geometry data in a transmission method according to embodiments.

FIG. 18 illustrates an exemplary method of partitioning points into an object based on geometry data (a threshold on a specific axis). In the left graph of FIG. 18, a vertical axis represents a z-axis value for each point, and each scale on a horizontal axis represents one point. A right table of FIG. 18 illustrates the number of points according to the z-axis value. Referring to FIG. 18, the number of points having a z value of 0 is 760 which is the largest number, and the number of points having a z value of 1 is rapidly reduced to two. Such data may be expressed as a histogram showing the distribution of the number of points according to the z value. Considering the distribution of the number of points according to the z-axis value, the z-axis value with a value of 0 may be set as the threshold. A road and an object may be separated such that points having a z-axis value is 0 or less may correspond to the road, and points having a z-axis value is 1 or more may correspond to the object. In addition, points may be separated according to each object by separating a group of points on an x-y plane based on a distance or based on another specific threshold.

In addition, the number of thresholds may be plural. For example, points having a z-axis value greater than or equal to a first threshold and less than a second threshold may be defined as points corresponding to the road, and the remaining points may be defined as points corresponding to the object. As illustrated in FIG. 18, a threshold may be determined using the distribution of the number of points corresponding to a specific value, i.e., using a histogram.

In addition, the object partitioner 21001 may partition the point cloud data into objects based on an instantaneous rate of change (an instantaneous gradient or a differential value) of geometry data and/or attribute data of points. That is, it is determined that an object is created or disappears based on a point at which geometry data (position information or geometry information) and/or attribute data of the point cloud data rapidly changes. In this case, a threshold of the instantaneous gradient serving as a criterion for distinguishing between objects may be at least one.

Meanwhile, the object partitioner 21001 may transform a coordinate system and partition the point cloud data into objects according to the above methods based on the transformed coordinate system (Cartesian, cylindrical, or spherical coordinate system). The above-described methods of partitioning the point cloud data into objects may be performed independently or in combination. The point cloud data partitioned into objects may be subjected to offset adjustment, re-partitioning into slices, encoding and/or decoding for each object, quantization/inverse quantization, and/or scaling/descaling. In addition, precision adjustment for each object, parallel execution of encoding/decoding, and/or motion vector estimation or motion vector compensation between objects in inter-frame prediction may be performed.

The object offset arranger 21002 is a component that adjusts an offset of the point cloud data partitioned into objects to arrange the point cloud data corresponding to each object to be close to each other.

Figure 19:
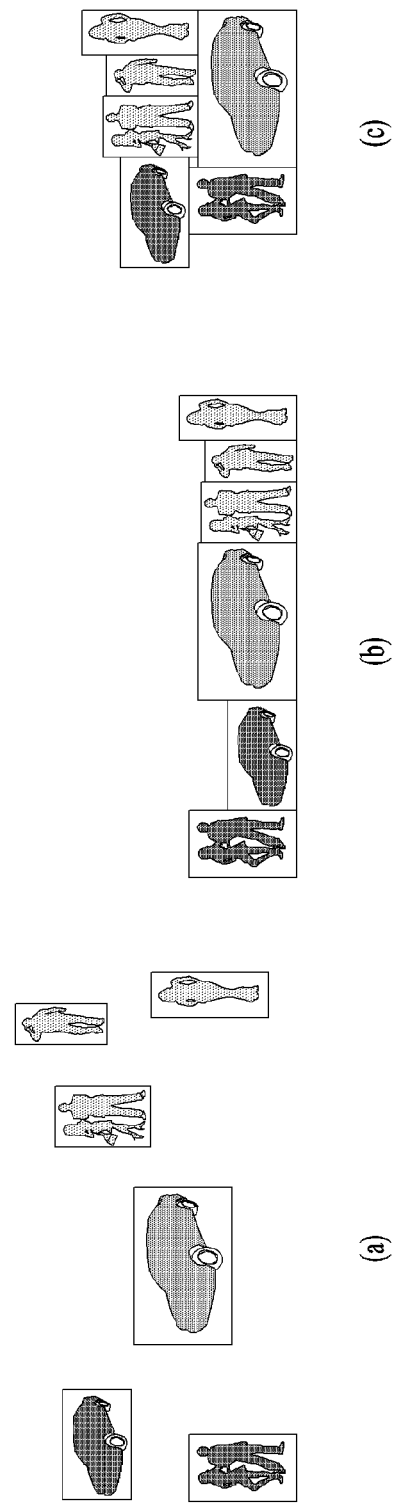
FIG. 19 illustrates exemplary objects that are (densely) arranged close to each other through offset adjustment in frame data according to embodiments.

FIG. 19 illustrates that objects that are distant in frame data are arranged close to each other by adjusting offsets of the objects. As illustrated in FIG. 19, objects positioned within one frame may be arranged close to each other through offset adjustment. In this case, an offset by which each object moves is signaled from the point cloud data transmission device according to embodiments to the point cloud data reception device according to embodiments. An object, an offset of which is adjusted, may be encoded in one slice unit or in other units. In addition, the separated road and objects may be re-partitioned into slices, and encoding/decoding may be performed individually on each object. In addition, points corresponding to an object may be divided into groups, and a coding unit may be limitedly applied so that point sorting, neighbor node search, prediction/lifting transformation, etc. are performed within a corresponding point group.

Meanwhile, the object offset arranger 21002 may arrange the objects in a straight type or a plane type by adjusting offsets of the objects. The method of arranging objects in a straight type is to arrange the objects in a line, and the method of arranging objects in a plane type is to gather the objects in a plane shape. An advantageous scheme for compression efficiency may be selectively applied to the arrangement types of objects according to a (predictive tree-based or octree-based) coding scheme. An appropriate value may be set as an offset so that bounding boxes in which objects are located may contact each other.

Encoding/decoding of geometry data and attribute data may be performed independently on each object, and an object unit may be defined by a slice or other units. In addition, when there are objects of a predetermined number or more, integration or separation between objects may be performed. An encoding method for each object may be signaled from the transmission device to the reception device.

The quantizer/scaler 21003 may perform quantization in units of objects and perform scaling. The quantized and/or scaled point cloud data may be encoded in the encoder and transferred as a bitstream to the decoder, and the decoder may perform inverse quantization and/or descaling to reconstruct the point cloud data.

Each object is distributed in a bounding box space. A high point density may be formed by separating points constituting the object in the space and distributing the points in a smaller space. Since compression efficiency of the point cloud data increases as the density of points increases, the compression efficiency may be increased by performing scaling after quantizing the points. Quantization information and/or scaling information obtained by performing quantization and scaling on each object is signaled from the transmission device to the reception device.

Figure 20:
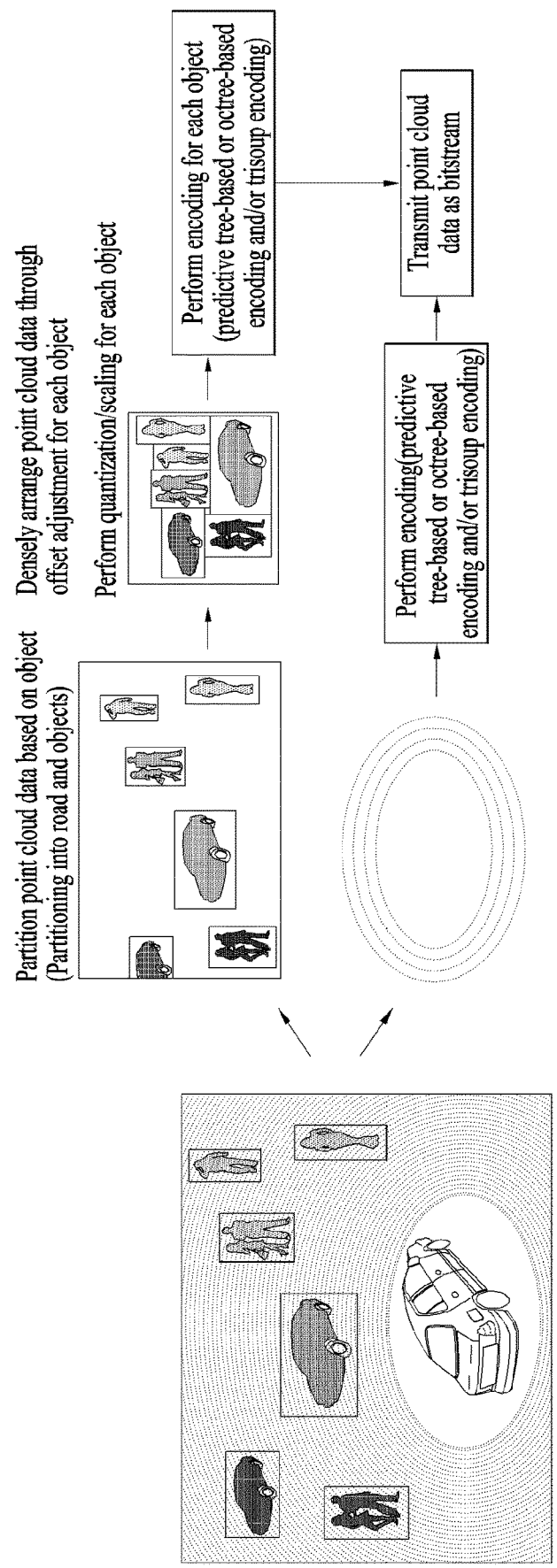
FIG. 20 illustrates exemplary processes of partitioning point cloud data into objects, encoding the point cloud data, and then transferring the point cloud data as a bitstream.

FIG. 20 schematically illustrates processes of partitioning point cloud data into objects, encoding the point cloud data, and then transferring the point cloud data as a bitstream. Each process may be selectively performed, and information generated by performing each process is signaled to the reception device. Referring to FIG. 20, point cloud data is partitioned into objects, and points are densely arranged with each other through offset adjustment. After quantization and/or scaling is performed, octree-based or predictive tree-based encoding and transmission as a bitstream are performed.

The encoding determiner 21004 is a component that determines an encoding method of geometry data or attribute data. The geometry data may be encoded using an octree-based or predictive tree-based encoding method, and the attribute data may be encoded based on prediction/lifting transformation, RAHT transformation, or a predictive tree. Information on the encoding method is signaled to the reception device, and the reception device reconstructs data based on the received information on the encoding method.

Figure 22:
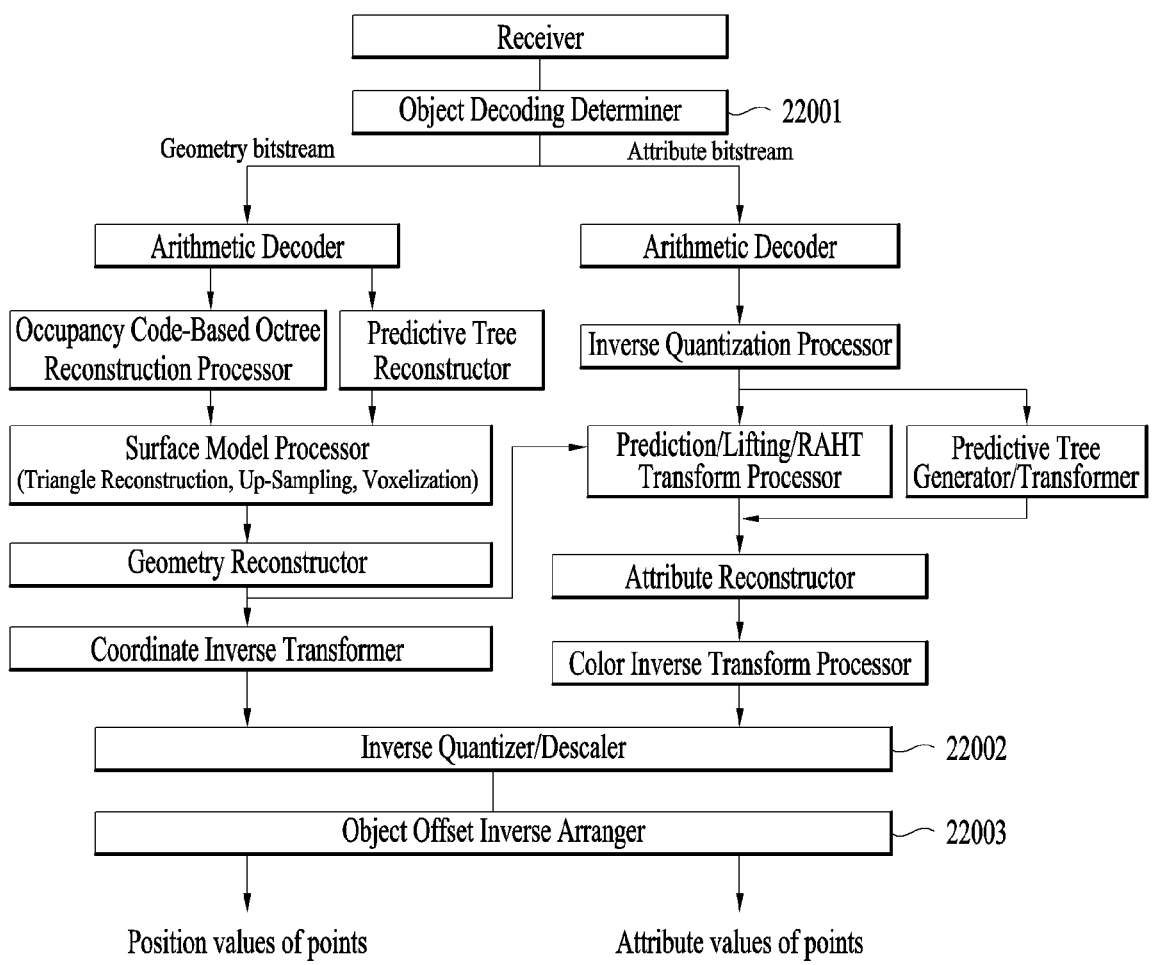
FIG. 22 illustrates an exemplary point cloud data reception device according to embodiments.

FIG. 22 illustrates an exemplary point cloud data reception device according to embodiments. The reception device (FIG. 22) may be configured by the point cloud video decoder 10006 of FIG. 1, the decoding process 20003 of FIG. 2, the decoder of FIG. 11, the reception device of FIG. 13, the XR device 1430 of FIG. 14, and/or hardware including one or more processors or integrated circuits configured to communicate with one or more memories, software, firmware, or a combination thereof. In addition, the reception device (FIG. 22) may correspond to the reception device 10004 of FIG. 1 and perform the decoding process 20003 of FIG. 2. In addition, the reception device (FIG. 22) may perform at least one of operations and methods identical or similar to the operations and decoding methods of the point cloud decoder described in FIGS. 1 to 11.

The point cloud data reception device according to the embodiments receives a bitstream including point cloud data and reconstructs geometry data and attribute data based on information on an encoding method. The point cloud data reception device according to the embodiments may include an object decoding determiner 22001, an inverse quantizer/descaler 22002, and/or an object offset inverse arranger 22003.

The object decoding determiner 22001 receives the information on the encoding method determined for each object from the encoding determiner 21004 of the transmission device and decodes information as to whether octree/predictive tree/trisoup geometry is coded for each object, whether prediction/lifting/RAHT transformation is performed, and/or whether a predictive tree-based attribute is coded.

The inverse quantizer/descaler 22002 may reconstruct original data by performing inverse quantization and/or descaling of point cloud data based on quantization information and/or scaling information for each object.

The object offset inverse arranger 22003 may reconstruct an object to an original position based on offset information (object_offset) of objects. The object offset inverse arranger 22003 may calculate an offset in units of bitstreams and decode bounding box information (object_whd) of an object.

The point cloud data transmission device according to the embodiments may transmit data partitioning information for each object, offset information for each object, quantization information, and/or scaling information to the reception device. Parameters (metadata, signaling information, etc.) according to the embodiments are generated in a point cloud data transmission process according to the embodiments and are transferred to the point cloud data reception device (FIG. 22) according to the embodiments so that the point could data reception device may use the parameters to reconstruct the point cloud data. For example, the parameters according to the embodiments may be generated in the metadata processor (or metadata generator) 12007 of the point cloud data transmission device according to the embodiments and may be obtained by the metadata parser 13006 of the point cloud data reception device according to the embodiments.

Figure 20A:
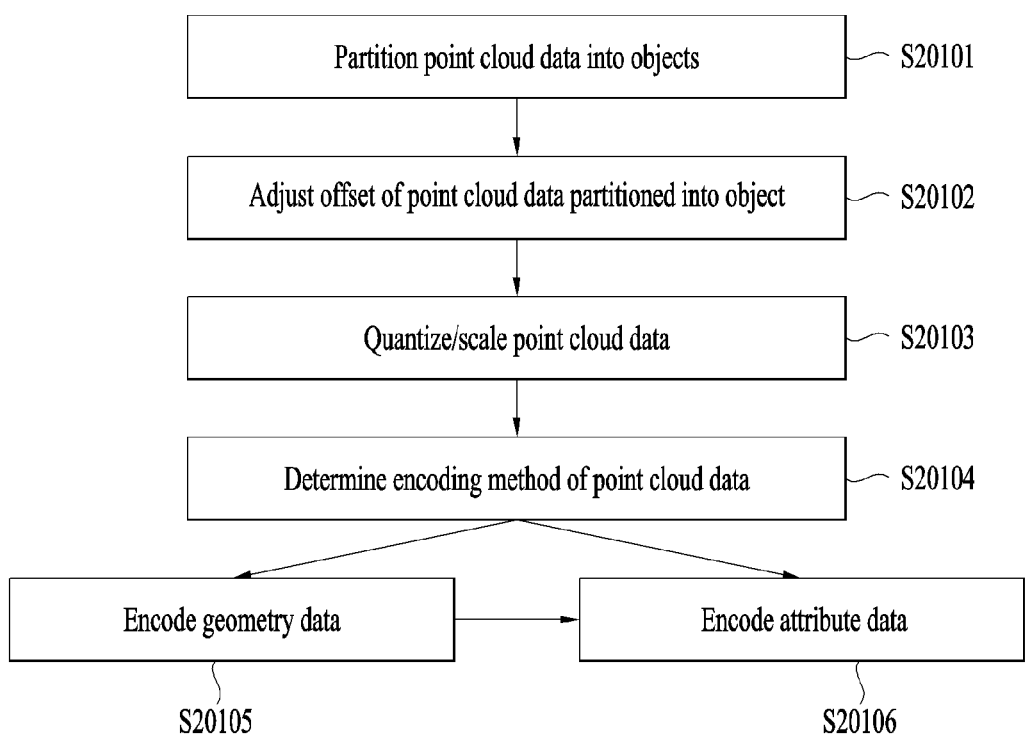
FIG. 20a illustrates an exemplary point cloud data transmission method according to embodiments.

FIG. 20a illustrates a more detailed example of a point cloud data transmission method according to embodiments. The point cloud data transmission method may include partitioning point cloud data into objects (S20101), adjusting an offset of the point cloud data (S20102), quantizing/scaling the point cloud data (S20103), and/or determining an encoding method of the point cloud data (S20104).

Partitioning the point cloud data into objects (S20101) may be performed by the object partitioner 21001. Partitioning the point cloud data into objects (S20101) may include partitioning the point cloud data into objects based on attribute data of points, geometry data of points, distribution of points, and/or change in data of points.

A process of partitioning the point cloud data based on the attribute data of the point cloud data may partition the point cloud data using reflectance and/or color of points. The process of partitioning the point cloud data into objects (S20101) may include partitioning the point cloud data into objects based on a value (geometry data) on a specific axis in consideration of distribution of points. In this case, the specific axis may be an x, y, or z axis or an arbitrary axis to which rotation/transformation is applied. In addition, the process of partitioning the point cloud data into objects (S20101) may include partitioning the point cloud data into objects based on an instantaneous rate of change (an instantaneous gradient or a differential value) of geometry data and/or attribute data of points. A description of the above-described methods is the same as in the description of the object partitioner 21001. On the other hand, a coordinate system may be transformed and the point cloud data may also be partitioned into objects according to the above-described methods based on the transformed coordinate system (Cartesian, cylindrical, or spherical coordinate system).

The process of adjusting the offset of the point cloud data (S20102) may be performed by the object offset arranger 21002. The process of adjusting the offset of the point cloud data (S20102) includes adjusting the offset of the point cloud data partitioned into objects to arrange the point cloud data corresponding to each object to be close to each other.

FIG. 19 illustrates that objects that are distant in frame data are arranged close to each other by adjusting offsets of the objects. Objects positioned within one frame may be (densely) arranged close to each other through offset adjustment. In this case, an offset by which each object moves is signaled from the point cloud data transmission device to the point cloud data reception device. An object, an offset of which is adjusted, may be encoded in one slice unit or in other units. In addition, the separated road and objects may be re-partitioned into slices, and encoding/decoding may be performed individually on each of the road and the objects. In addition, points corresponding to an object may be divided into point groups, and a coding unit may be limitedly applied so that point sorting, neighbor node search, prediction/lifting transformation, etc. are performed within a corresponding point group.

Meanwhile, the process of adjusting the offset of the point cloud data (S20102) may include arranging the objects in a straight type or a plane type by adjusting offsets of the objects. The method of arranging objects in a straight type is to arrange the objects in a line, and the method of arranging objects in a plane type is to gather the objects in a plane shape. An advantageous scheme for compression efficiency may be selectively applied to the arrangement types of objects according to a (predictive tree-based or octree-based) coding scheme. An appropriate value may be set as an offset so that bounding boxes in which objects are located may contact each other.

The process of quantizing/scaling the point cloud data (S20103) may be performed by the quantizer/scaler 21003. The process of quantizing/scaling the point cloud data (S20103) may include performing quantization and scaling in units of objects. The quantized and/or scaled point cloud data may be encoded in the encoder and transferred as a bitstream to the reception device, and the reception device may perform inverse quantization and/or descaling to reconstruct the point cloud data.

The process of determining the encoding method of the point cloud data (S20104) may be performed by the encoding determiner 21004. The process of determining the encoding method of the point cloud data (S20104) include determining the encoding method of geometry data or attribute data. The geometry data may be encoded using an octree-based or predictive-tree-based encoding method, and the attribute data may be encoded based on prediction/lifting transformation, RAHT transformation, or a predictive tree. Information on the encoding method is signaled to the decoder, and the decoder reconstructs data based on the received information on the encoding method.

The point cloud data transmission method according to the embodiments may partition point cloud data into objects and adjust an offset to (densely) arrange the point cloud data close to each other by the configuration described above. Therefore, the problem of deterioration in compression efficiency due to the low density of points of category 3 frame data may be improved, quantization and/or scaling may be performed on each object, and various encoding/decoding methods may be applied according to distribution of points. Therefore, there is an effect of expanding the range of an efficient data processing method. In addition, motion estimation is performed by separating a road and an object during inter-frame prediction, thereby increasing prediction accuracy and efficiency.

Figure 20B:
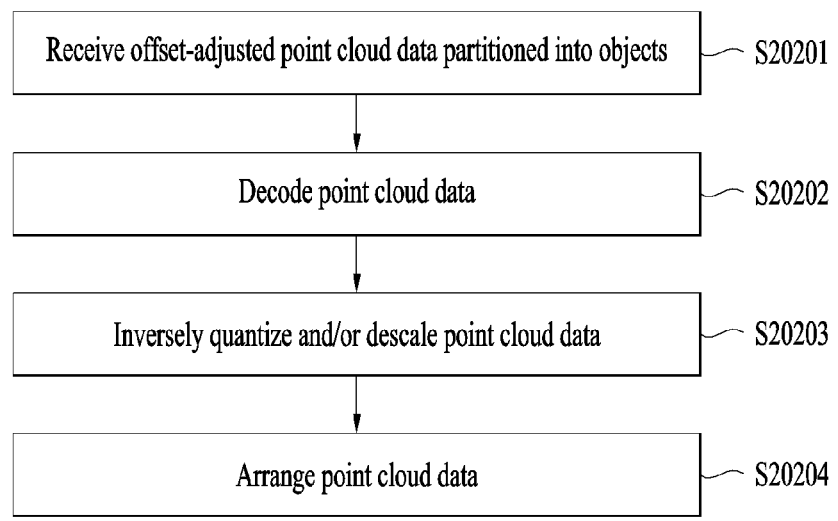
FIG. 20b illustrates an exemplary point cloud data reception method according to embodiments.

FIG. 20b illustrates a more detailed example of a point cloud data reception method according to embodiments. The reception method (FIG. 20b) may include receiving point cloud data which is partitioned into objects and for which an offset is adjusted (S20201), decoding the point cloud data (S20202), and inversely quantizing and/or descaling the point cloud data (S20203), and/or reconstructing the point cloud data to an original position (S20204). Each process of the reception method (FIG. 20b) may be performed by the reception device (FIG. 22). The reception device (FIG. 22) may include a receiver, the object decoding determiner 22001, the inverse quantizer/descaler 22002, and/or an object offset inverse arranger 22003. In addition, the reception device (FIG. 22) may additionally include components related to decoding of geometry data and/or attribute data.

The process of receiving the offset-adjusted point cloud data partitioned into objects (S20201) may be performed by the receiver. The point cloud data processed by the transmission device (FIG. 21) is partitioned into objects, and offset thereof is adjusted. Then the point cloud data is transferred to the reception device (FIG. 22) in a dense state of points. Accordingly, the point cloud data included in the bitstream received by the receiver may be point cloud data that has been partitioned into objects based on attribute data of the point cloud data. Alternatively, the point cloud data included in the received bitstream may be point cloud data that has been partitioned into objects based on a value (geometry data) on a specific axis or based on a change in positions of points or a change in the number of points. A description of a method of partitioning the point cloud data into objects is the same as the above description related to the object partitioner 21001.

The process of decoding the point cloud data (S3010 and S20202) includes decoding the geometry data of the point cloud data and decoding the attribute data of the point cloud data. Decoding the geometry data or decoding the attribute data may be performed by an appropriate method according to a method of encoding data in the transmission device according to the embodiments. The object decoding determiner 22001 of the reception device (FIG. 22) decodes information on the encoding method of the transmission device (FIG. 21), and the process of decoding the point cloud data (S3010, S20202) may include decoding the geometry data and/or the attribute data using an appropriate method based on the information.

The process of inversely quantizing and/or descaling the point cloud data (S20203) may be performed by the inverse quantizer/descaler 22002. The process of inversely quantizing and/or descaling the point cloud data (S20203) includes performing inverse quantization and/or descaling of the point cloud data based on quantization information and/or scaling information for each object.

The process of reconstructing the point cloud data to an original position (S20204) may be performed by the object offset inverse arranger 22003. An object is reconstructed to an original position based on offset information (object_offset) of objects. An offset may be calculated in units of bitstreams, and bounding box information (object_whd) of an object may be decoded.

The point cloud data reception method according to the embodiments decodes point cloud data which is dense through offset adjustment for each object by the configuration described above. Therefore, compression efficiency may be increased and an appropriate decoding method may be performed by applying various encoding/decoding methods to each object. Thus, there is an effect of expanding the range of a data processing method. In addition, motion estimation is performed by separating a road and an object during inter-frame prediction, thereby increasing prediction accuracy and efficiency.

Figure 23:
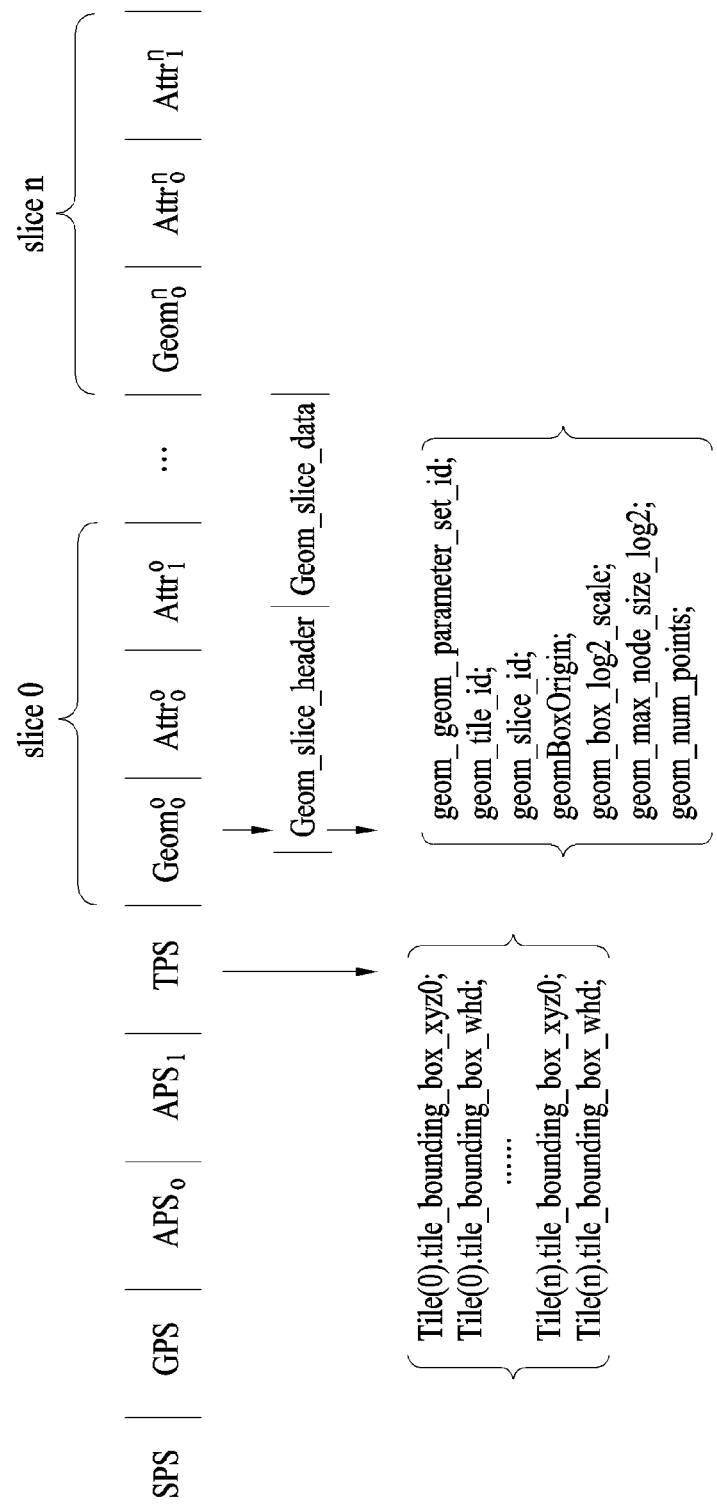
FIG. 23 illustrates an exemplary encoded point cloud data according to embodiments.

FIG. 23 illustrates an example of encoded point cloud data according to embodiments. The point cloud video encoder 10002 according to the embodiments may encode point cloud data in an encoding process 20001, and the transmitter 10003 according to the embodiments may transmit a bitstream including the encoded point cloud data to the reception device 10004.

The encoded point cloud data (bitstream) according to the embodiments may be generated by the point cloud video encoder 10002 of FIG. 1, the encoding process 20001 of FIG. 2, the encoder of FIG. 4, the transmission device of FIG. 12, the XR device 1430 of FIG. 14, the transmission device of FIG. 21, and/or hardware including one or more processors or integrated circuits configured to communicate with one or more memories, software, firmware, or a combination thereof.

The encoded point cloud data (bitstream) according to the embodiments may be decoded by the point cloud video decoder 10006 of FIG. 1, the decoding process 20003 of FIG. 2, the decoder of FIG. 11, the reception device of FIG. 13, the XR device 1430 of FIG. 14, the reception device of FIG. 22, and/or hardware including one or more processors or integrated circuits configured to communicate with one or more memories, software, firmware, or a combination thereof.

The meanings of the abbreviations shown in FIG. 23 are as follows.

SPS: Sequence Parameter Set
GPS: Geometry Parameter Sets
APS: Attribute Parameter Set
TPS: Tile Parameter Set
Geom: Geometry bitstream=geometry slice header+geometry slice data
Attr: Attribute bitstream=Attribute brick header+attribute brick data Tiles or slices may be provided so that point cloud data may be divided into regions and processed. When the point cloud data is divided into regions, each region may be configured to have a different importance level. Accordingly, a filtering method having high complexity but high resultant quality may be used for an important region by allowing a different filter or a different filter unit to be applied according to an importance level.

In addition, depending on the processing capabilities of the reception device, different filtering may be applied to each region (region divided into tiles or slices) instead of using a complicated filtering method for the entire point cloud data. Therefore, an improved image quality in an important region and an appropriate latency in a system may be guaranteed. That is, when a region of the point cloud data is divided into tiles, a different filter or a different filter unit may be applied to each tile. In addition, when a region of the point cloud data is divided into slices, a different filter or a different filter unit may be applied to each slice.

The point cloud data transmission device according to the embodiments may signal information on object partitioning, an offset, quantization/scaling, and/or an encoding method of the point cloud data, being included in each parameter set, to the point cloud data reception device according to the embodiments.

FIG. 24 illustrates an exemplary syntax of an SPS according to embodiments. Information on an object partitioning method, an offset, and/or quantization/scaling of point cloud data may be signaled in the SPS.

An object partitioning method (object_partitioning_method) defines a method of partitioning point cloud data into objects. If this value is 0, this corresponds to a method of partitioning the point cloud data into objects based on reflectance. If the value is 1, this corresponds to a method of partitioning the point cloud data into objects based on a threshold (geometry data) on a specific axis. If the value is 2, this corresponds to a method of partitioning the point cloud data into objects based on an instantaneous gradient (differential value). If the value is 4, this corresponds to other methods.

An object number (object_num) defines the number of objects partitioned by the object partitioning method (object_partitioning_method).

A for loop may create the following field information repeated by the number of objects defined as the object number (object_num).

An object offset (object_offset) defines an offset of an object. The object offset signals the actual position of the point cloud data and the position of the point cloud data adjusted by the offset.

An object quantization flag (object_quantization_flag) signals whether an object is quantized.

An object scaling flag (object_scaling_flag) signals whether an object is scaled.

An object quantization parameter (object_quantization_parameter) signals a quantized quantization parameter when the object quantization flag (object_quantization_flag) is True.

An object scaling value (object_scaling_value) represents a scaled value when the object scaling flag (object_scaling_flag) is True.

An object width, height, and depth (WHD) (object_whd) defines the spatial volume of an object as the width, height, and depth of a partitioned object.

In addition to this field information, parameters related to a sequence may be further transmitted in the SPS.

FIG. 25 illustrates an exemplary syntax of a TPS according to embodiments. Information on an object partitioning method, an offset, and/or quantization/scaling of point cloud data may be signaled in the TPS.

An object partitioning method (object_partitioning_method) defines a method of partitioning point cloud data into objects. If this value is 0, this corresponds to a method of partitioning the point cloud data into objects based on reflectance. If the value is 1, this corresponds to a method of partitioning the point cloud data into objects based on a threshold (geometry data) on a specific axis. If the value is 2, this corresponds to a method of partitioning the point cloud data into objects based on an instantaneous gradient (differential value). If the value is 4, this corresponds to other methods.

An object number (object_num) defines the number of objects partitioned by the object partitioning method (object_partitioning_method).

A for loop may create the following field information repeated by the number of objects defined as the object number (object_num).

An object offset (object_offset) defines an offset of an object. The object offset signals the actual position of the point cloud data and the position of the point cloud data adjusted by the offset.

An object quantization flag (object_quantization_flag) signals whether an object is quantized.

An object scaling flag (object_scaling_flag) signals whether an object is scaled.

An object quantization parameter (object_quantization_parameter) signals a quantized quantization parameter when the object quantization flag (object_quantization_flag) is True.

An object scaling value (object_scaling_value) represents a scaled value when the object scaling flag (object_scaling_flag) is True.

An object WHD (object_whd) defines the spatial volume of an object as the width, height, and depth of a partitioned object.

In addition to this field information, parameters related to a tile may be further transmitted in the TPS.

FIG. 26 illustrates an exemplary syntax of a GPS according to embodiments. Information on an object partitioning method, an offset, and/or quantization/scaling of point cloud data may be signaled in the GPS.

An object partitioning method (object_partitioning_method) defines a method of partitioning point cloud data into objects. If this value is 0, this corresponds to a method of partitioning the point cloud data into objects based on reflectance. If the value is 1, this corresponds to a method of partitioning the point cloud data into objects based on a threshold (geometry data) on a specific axis. If the value is 2, this corresponds to a method of partitioning the point cloud data into objects based on an instantaneous gradient (differential value). If the value is 4, this corresponds to other methods.

An object number (object_num) defines the number of objects partitioned by the object partitioning method (object_ partitioning_method).

A for loop may create the following field information repeated by the number of objects defined as the object number (object_num).

An object offset (object_offset) defines an offset of an object. The object offset signals the actual position of the point cloud data and the position of the point cloud data adjusted by the offset.

An object quantization flag (object_quantization_flag) signals whether an object is quantized.

An object scaling flag (object_scaling_flag) signals whether an object is scaled.

An object quantization parameter (object_quantization_parameter) signals a quantized quantization parameter when the object quantization flag (object_quantization_flag) is True.

An object scaling value (object_scaling_value) represents a scaled value when the object scaling flag (object_scaling_flag) is True.

An object WHD (object_whd) defines the spatial volume of an object as the width, height, and depth of a partitioned object.

In addition to this field information, parameters related to geometry may be further transmitted in the GPS.

FIG. 27 illustrates an exemplary syntax of an APS according to embodiments. Information on an object partitioning method, an offset, and/or quantization/scaling of point cloud data may be signaled in the APS.

An object partitioning method (object_partitioning_method) defines a method of partitioning point cloud data into objects. If this value is 0, this corresponds to a method of partitioning the point cloud data into objects based on reflectance. If the value is 1, this corresponds to a method of partitioning the point cloud data into objects based on a threshold (geometry data) on a specific axis. If the value is 2, this corresponds to a method of partitioning the point cloud data into objects based on an instantaneous gradient (differential value). If the value is 4, this corresponds to other methods.

An object number (object_num) defines the number of objects partitioned by the object partitioning method (object_ partitioning_method).

A for loop may create the following field information repeated by the number of objects defined as the object number (object_num).

An object offset (object_offset) defines an offset of an object. The object offset signals the actual position of the point cloud data and the position of the point cloud data adjusted by the offset.

An object quantization flag (object_quantization_flag) signals whether an object is quantized.

An object scaling flag (object_scaling_flag) signals whether an object is scaled.

An object quantization parameter (object_quantization_parameter) signals a quantized quantization parameter when the object quantization flag (object_quantization_flag) is True.

An object scaling value (object_scaling_value) represents a scaled value when the object scaling flag (object_scaling_flag) is True.

An object WHD (object_whd) defines the spatial volume of an object as the width, height, and depth of a partitioned object.

In addition to this field information, parameters related to an attribute may be further transmitted in the APS.

FIG. 28 illustrates an exemplary syntax of a slice header of a geometry bitstream according to embodiments. Information on an object partitioning method, an offset, and/or quantization/scaling of point cloud data may be signaled in the APS.

An object partitioning method (object_partitioning_method) defines a method of partitioning point cloud data into objects. If this value is 0, this corresponds to a method of partitioning the point cloud data into objects based on reflectance. If the value is 1, this corresponds to a method of partitioning the point cloud data into objects based on a threshold (geometry data) on a specific axis. If the value is 2, this corresponds to a method of partitioning the point cloud data into objects based on an instantaneous gradient (differential value). If the value is 4, this corresponds to other methods.

An object number (object_num) defines the number of objects partitioned by the object partitioning method (object_ partitioning_method).

A for loop may create the following field information repeated by the number of objects defined as the object number (object_num).

An object offset (object_offset) defines an offset of an object. The object offset signals the actual position of the point cloud data and the position of the point cloud data adjusted by the offset.

An object quantization flag (object_quantization_flag) signals whether an object is quantized.

An object scaling flag (object_scaling_flag) signals whether an object is scaled.

An object quantization parameter (object_quantization_parameter) signals a quantized quantization parameter when the object quantization flag (object_quantization_flag) is True.

An object scaling value (object_scaling_value) represents a scaled value when the object scaling flag (object_scaling_flag) is True.

An object WHD (object_whd) defines the spatial volume of an object as the width, height, and depth of a partitioned object.

In addition to this field information, parameters related to a geometry slice may be further transmitted in the slice header of the geometry bitstream Geom.

Figure 29:
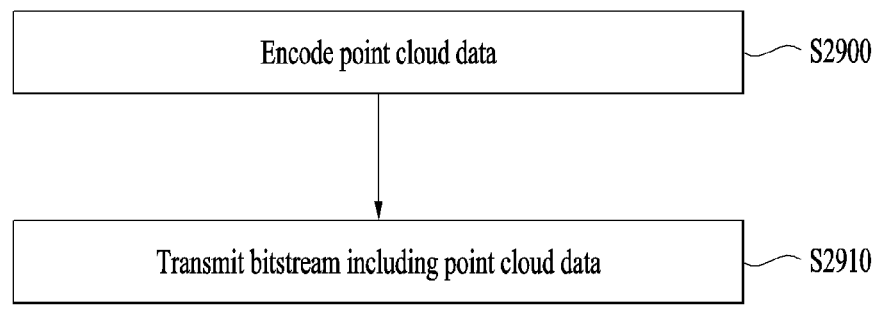
FIG. 29 illustrates an exemplary point cloud data transmission method according to embodiments.

FIG. 29 illustrates an exemplary point cloud data transmission method according to embodiments. Referring to FIG. 29, the point cloud data transmission method includes encoding point cloud data (S2900) and transmitting a bitstream including the point cloud data (S2910).

The process of encoding the point cloud data (S2900) includes encoding the point cloud data by the point cloud video encoder 10002 of FIG. 1, the encoding process 20001 of FIG. 2, the encoder of FIG. 4, the transmission device of FIG. 12, the XR device 1430 of FIG. 14, the transmission device of FIG. 21, and/or hardware including one or more processors or integrated circuits configured to communicate with one or more memories, software, firmware, or a combination thereof.

The process of transmitting the bitstream including the point cloud data (S2910) includes transmitting the bitstream by the transmitter 10003 of FIG. 1, the transmission processor 12012 of FIG. 12, the XR device 1430 of FIG. 14, the transmission device of FIG. 21, and/or hardware including one or more processors or integrated circuits configured to communicate with one or more memories, software, firmware, or a combination thereof.

The process of encoding the point cloud data (S2900) includes encoding geometry data and encoding attribute data. The process of encoding the geometry data may include encoding the geometry data using octree-based or predictive tree-based encoding or trisoup encoding, and the process of encoding the attribute data may include encoding the attribute data based on prediction/lifting transformation, RATH transformation, or a predictive tree. In addition, the process of encoding the point cloud data (S2900) may be connected to or include the processes (S20101, S20102, S20103, and/or S20104) illustrated in FIG. 20a.

The point cloud data transmission method according to the embodiments disclosed herein may include partitioning the point cloud data into objects and adjusting an offset to (densely) arrange the objects close to each other. Therefore, deterioration in compression efficiency depending on the density of points of frame data may be improved, quantization and/or scaling may be performed on each object, and various encoding/decoding methods may be applied according to distribution of points. Thus, the point cloud data transmission method has an effect of expanding the range of an efficient data processing method. In addition, motion estimation is performed by separating a road and an object during inter-frame prediction, thereby increasing prediction accuracy and efficiency.

Figure 30:
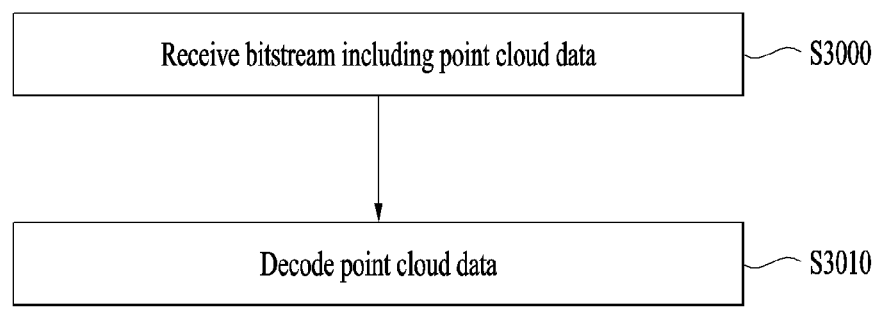
FIG. 30 illustrates an exemplary point cloud data reception method according to embodiments.

FIG. 30 illustrates an exemplary point cloud data reception method according to embodiments. Referring to FIG. 30, the point cloud data reception method includes receiving a bitstream including point cloud data (S3000) and decoding the point cloud data (S3010).

The process of receiving the bitstream including the point cloud data (S3000) includes receiving the point cloud data by the reception device 10004 of FIG. 1, the reception device of FIG. 10 or 11, the receiver 13000 of FIG. 13, the XR device 1430 of FIG. 14, the reception device of FIG. 22, and/or hardware including one or more processors or integrated circuits configured to communicate with one or more memories, software, firmware, or a combination thereof.

The process of decoding the point cloud data (S3010) may include decoding the point cloud data by the point cloud video decoder 10006 of FIG. 1, the reception device of FIG. 10, 11, or 13, the XR device 1430 of FIG. 14, the reception device of FIG. 22, and/or hardware including one or more processors or integrated circuits configured to communicate with one or more memories, software, firmware, or a combination thereof. In addition, the process of decoding the point cloud data (S3010) may be performed in connection with the processes (S20201, S20202, S20203, and/or S20204) illustrated in FIG. 20b or may include the above processes.

The process of receiving the bitstream including the point cloud data (S3000) may be performed by the receiver of the reception device (FIG. 22). The received bitstream includes point cloud data in which points are partitioned into objects and for which an offset is adjusted to (densely) arrange the point cloud data close to each other. In addition, the bitstream includes signaling information on object partitioning, an offset, and an encoding method performed by the transmission device (FIG. 21).

The point cloud data reception method according to the embodiments disclosed herein includes receiving point cloud data which is partitioned into objects and for which an offset is adjusted to (densely) arrange the point cloud data close to each other. Therefore, deterioration in compression efficiency depending on the density of points of frame data may be improved, inverse quantization and/or descaling may be performed on each object, and various encoding/decoding methods may be applied according to distribution of points. Thus, the point cloud data reception method has an effect of expanding the range of an efficient data processing method. In addition, motion estimation is performed by separating a road and an object during inter-frame prediction, thereby increasing prediction accuracy and efficiency.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same.

Executable instructions for performing the method/operations of the device according to the embodiments may be stored in a non-transitory CRM or other computer program products configured to be executed by one or more processors, or may be stored in a transitory CRM or other computer program products configured to be executed by one or more processors.

In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system. It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

What is claimed is:

1. A point cloud data encoding method by an encoder, comprising:
   encoding geometry data of the point cloud data;
   encoding attribute data of the point cloud data; and
   transmitting a bitstream including the point cloud data,
   wherein points for the point cloud data are partitioned into a road and an object,
   wherein the bitstream includes information for representing a method for the partitioning the point cloud data,
   wherein the object is partitioned based on a block including a number of points on an axis,
   wherein the bitstream further includes information related to the block.

2. The point cloud data transmission method of claim 1, further comprising:
   partitioning the point cloud data into objects; and
   adjusting an offset of the point cloud data partitioned into the objects.

3. The point cloud data transmission method of claim 2, wherein the partitioning the point cloud data into the objects includes
   partitioning the point cloud data into the objects based on the attribute data of the point cloud data.

4. The point cloud data transmission method of claim 2, wherein the partitioning the point cloud data into the objects includes
   partitioning the point cloud data into the objects based on the geometry data of the point cloud data.

5. The point cloud data transmission method of claim 2, wherein the partitioning the point cloud data into the objects includes
   partitioning the point cloud data into the objects based on an instantaneous value of change of geometry data or attribute data of points.

6. The point cloud data transmission method of claim 2, wherein adjusting the offset of the point cloud data partitioned into the objects includes
   adjusting the offset of the point cloud data corresponding to each object to arrange the point cloud data close to each other.

7. A point cloud data transmission device, comprising:
   an encoder configured to encode geometry data of the point cloud data,
   encode attribute data of the point cloud data; and
   a transmitter configured to transmit a bitstream including the point cloud data,
   wherein points for the point cloud data are partitioned into a road and an object, wherein the bitstream includes information for representing a method for the partitioning the point cloud data,
wherein the object is partitioned based on a block including a number of points on an axis,
wherein the bitstream further includes information related to the block.

8. The point cloud data transmission device of claim 7, wherein the encoder partitions the point cloud data into the objects based on attribute data of the point cloud data.

9. The point cloud data transmission device claim 7, wherein the encoder partitions the point cloud data into the objects based on geometry data of the point cloud data.

10. The point cloud data transmission device of claim 7, wherein the encoder partitions the point cloud data into the objects based on an instantaneous value of change of geometry data or attribute data of points.

11. The point cloud data transmission device of claim 7, wherein the encoder adjusts the offset of the point cloud data corresponding to each object to arrange the point cloud data close to each other.

12. A point cloud data decoding method by a decoder, comprising:
   receiving a bitstream including point cloud data;
   decoding geometry data of the point cloud data;
   decoding attribute data of the point cloud data; and
   rendering the point cloud data,
   wherein points for the point cloud data are partitioned into a road and an object,
   wherein the bitstream includes information for representing a method for the partitioning the point cloud data,
   wherein the object is partitioned based on a block including a number of points on an axis,
   wherein the bitstream further includes information related to the block.

13. The point cloud data reception method of claim 12, wherein the bitstream includes point cloud data in which points are partitioned into objects and for which an offset is adjusted, and
   wherein the method further includes arranging the points which are partitioned into objects and for which an offset is adjusted.

14. The point cloud data reception method of claim 13, wherein the bitstream includes the point cloud data partitioned into the objects based on attribute data of the point cloud data.

15. The point cloud data reception method of claim 13, wherein the bitstream includes the point cloud data partitioned into the objects based on geometry data of the point cloud data.

16. The point cloud data reception method of claim 13, wherein the bitstream includes the point cloud data partitioned into the objects based on an instantaneous value of change of geometry data or attribute data of the points.

17. A point cloud data reception device, comprising:
   a receiver configured to receive a bitstream including point cloud data;
   a decoder configured to decode geometry data of the point cloud data,
   decode attribute data of the point cloud data; and
   a renderer configured to render the point cloud data,
   wherein points for the point cloud data are partitioned into a road and an object,
   wherein the bitstream includes information for representing a method for the partitioning the point cloud data,
   wherein the object is partitioned based on a block including a number of points on an axis,
   wherein the bitstream further includes information related to the block.

18. The point cloud data reception device of claim 17, wherein the bitstream includes the point cloud data in which points are partitioned into objects and for which an offset is adjusted to arrange the point cloud data close to each other.

19. The point cloud data reception device of claim 18, wherein the bitstream includes the point cloud data partitioned into the objects based on attribute data of the point cloud data.

20. The point cloud data reception device of claim 18, wherein the bitstream includes the point cloud data partitioned into the objects based on geometry data of the point cloud data.

21. The point cloud data reception device of claim 18, wherein the bitstream includes the point cloud data partitioned into the objects based on an instantaneous value of change of geometry data or attribute data of the points.

22. The point cloud data reception device of claim 18, further comprising an object offset inverse arranger configured to arrange the offset-adjusted point cloud data based on offset information.

* * * * *